(12) United States Patent
Masoudi

(10) Patent No.: US 10,598,068 B2
(45) Date of Patent: Mar. 24, 2020

(54) CATALYTIC CONVERTERS HAVING NON-LINEAR FLOW CHANNELS

(71) Applicant: Mansour Masoudi, Mill Creek, WA (US)

(72) Inventor: Mansour Masoudi, Mill Creek, WA (US)

(73) Assignee: EMISSOL, LLC, Mill Creek, WA (US)

( * ) Notice: Subject to any disclaimer, the term of this patent is extended or adjusted under 35 U.S.C. 154(b) by 0 days.

(21) Appl. No.: 15/384,335

(22) Filed: Dec. 20, 2016

(65) Prior Publication Data

US 2017/0175609 A1 Jun. 22, 2017

Related U.S. Application Data

(60) Provisional application No. 62/270,532, filed on Dec. 21, 2015.

(51) Int. Cl.
*F01N 3/28* (2006.01)
*B01J 35/04* (2006.01)
(Continued)

(52) U.S. Cl.
CPC ............ *F01N 3/2842* (2013.01); *B01J 35/04* (2013.01); *B01J 37/0009* (2013.01);
(Continued)

(58) Field of Classification Search
None
See application file for complete search history.

(56) References Cited

U.S. PATENT DOCUMENTS

| 3,186,806 A | 6/1965 | Stiles |
| 3,489,809 A | 1/1970 | Kieth et al. |

(Continued)

FOREIGN PATENT DOCUMENTS

| DE | 2002101042 | 7/2003 |
| EP | 0117602 A2 | 9/1984 |
| EP | 0153157 A2 | 8/1985 |
| JP | 3845873 B2 | 11/2006 |

OTHER PUBLICATIONS

Nivedita et al. Evolution of Secondary Dean Vortices in Spiral Microchannels for Cell Separations, 17th International Conference on Miniaturized Systems for Chemistry and Life Sciences. Oct. 27-31, 2013. Freiburg, Germany. pp. 639-641. http://www.rsc.org/images/loc/2013/PDFs/Papers/215_1109.pdf (Year: 2013).*

(Continued)

*Primary Examiner* — Walter D. Griffin
*Assistant Examiner* — Jelitza M Perez
(74) *Attorney, Agent, or Firm* — Loza & Loza, LLP; Mark L. Cooper

(57) ABSTRACT

Disclosed is a honeycomb catalyst substrate core having geometrically non-linear flow channels. In an embodiment, the honeycomb catalyst substrate core includes helical flow channels. In another embodiment, the honeycomb catalyst substrate core includes sinusoidal flow channels. In yet another embodiment, the honeycomb catalyst substrate core includes helical plus sinusoidal flow channels. The honeycomb catalyst substrate core comprises a plurality of parallel non-linear flow channels formed along a longitudinal axis of symmetry of the catalyst substrate core, each non-linear flow channel configured such that a turbulent vortical flow occurs during engine exhaust gas flow. Also disclosed is a method for manufacturing a ceramic honeycomb having non-linear flow channels, comprising the steps extrusion soft ceramic material through a die whilst the die moves through six degrees of freedom along its axis of symmetry. Disclosure includes a method for manufacturing a ceramic honeycomb having non-linear flow channels using three-dimensional printing.

26 Claims, 13 Drawing Sheets

(51) Int. Cl.
  *B01J 37/02* (2006.01)
  *B01J 37/08* (2006.01)
  *B01J 37/00* (2006.01)
  *C04B 38/00* (2006.01)
  *C04B 111/00* (2006.01)

(52) U.S. Cl.
  CPC ....... *B01J 37/0215* (2013.01); *B01J 37/0217* (2013.01); *B01J 37/0225* (2013.01); *B01J 37/08* (2013.01); *C04B 38/0006* (2013.01); *F01N 3/281* (2013.01); *F01N 3/2828* (2013.01); *C04B 2111/0081* (2013.01); *F01N 2330/34* (2013.01)

(56) References Cited

U.S. PATENT DOCUMENTS

| | | |
|---|---|---|
| 3,771,973 A | 11/1973 | Miller |
| 3,790,654 A | 2/1974 | Bagley |
| 3,852,042 A | 12/1974 | Wagner |
| 3,853,485 A | 12/1974 | Hogan |
| 3,892,537 A | 7/1975 | Gulati et al. |
| 3,903,341 A | 9/1975 | Gerhold |
| 3,948,810 A | 4/1976 | Hervert |
| 3,979,185 A | 9/1976 | Stevenson |
| 3,989,471 A | 9/1976 | Nowak |
| 4,039,292 A | 8/1977 | Morini et al. |
| 4,264,561 A | 4/1981 | Goedicke |
| 4,264,567 A | 4/1981 | Pinto |
| 4,280,926 A | 7/1981 | Abe et al. |
| 4,329,162 A | 5/1982 | Pitcher, Jr. |
| 4,347,219 A | 8/1982 | Noritake et al. |
| 4,348,360 A | 9/1982 | Chang et al. |
| 4,394,351 A | 7/1983 | Gast |
| 4,448,828 A | 5/1984 | Mochida |
| 4,520,124 A | 5/1985 | Abe |
| 4,536,371 A | 8/1985 | Thayer et al. |
| 4,566,882 A | 1/1986 | Hoffmann et al. |
| 4,619,912 A | 10/1986 | Jalbing et al. |
| 4,711,009 A | 12/1987 | Cornelison et al. |
| 4,782,570 A | 11/1988 | Spridco |
| 4,782,661 A | 11/1988 | Motley et al. |
| 4,795,616 A | 1/1989 | Mondt et al. |
| 4,797,263 A | 1/1989 | Oza |
| 4,928,485 A | 5/1990 | Whittenberger |
| 4,976,929 A | 12/1990 | Cornelison et al. |
| 4,984,487 A | 1/1991 | Beckmeyer |
| 5,026,273 A | 6/1991 | Cornelison |
| 5,063,029 A | 11/1991 | Mizuno et al. |
| 5,065,576 A | 11/1991 | Kanazawa et al. |
| 5,108,716 A | 4/1992 | Nishizawa |
| 5,118,476 A | 6/1992 | Dryer et al. |
| 5,119,551 A | 6/1992 | Abbott |
| 5,130,100 A | 7/1992 | Serizawa |
| 5,140,813 A | 8/1992 | Whittenberger |
| 5,154,894 A | 10/1992 | MacFarlane et al. |
| 5,170,624 A | 12/1992 | Cornelison et al. |
| 5,173,267 A | 12/1992 | Maus et al. |
| 5,185,998 A | 2/1993 | Brew |
| 5,187,142 A | 2/1993 | Richmond et al. |
| 5,220,789 A | 6/1993 | Riley et al. |
| 5,232,671 A | 8/1993 | Brunson et al. |
| 5,272,875 A | 12/1993 | Kaji |
| 5,322,537 A | 3/1994 | Nakamura et al. |
| 5,317,869 A | 6/1994 | Takeuchi |
| 5,318,757 A | 6/1994 | Abe et al. |
| 5,319,929 A | 6/1994 | Cornelison et al. |
| 5,330,728 A | 7/1994 | Foster |
| 5,365,735 A | 11/1994 | Weber et al. |
| 5,378,435 A | 1/1995 | Gavoni |
| 5,388,408 A | 2/1995 | Lawrence |
| 5,408,828 A | 4/1995 | Kreucher et al. |
| 5,431,330 A | 7/1995 | Wieres |
| 5,436,216 A | 7/1995 | Toyao et al. |
| 5,477,676 A | 12/1995 | Benson et al. |
| 5,488,826 A | 2/1996 | Paas |
| 5,569,455 A | 10/1996 | Fukui et al. |
| 5,578,277 A | 11/1996 | White et al. |
| 5,606,856 A | 3/1997 | Linder et al. |
| 5,633,066 A * | 5/1997 | Lipp .................. B01J 19/2485  428/116 |
| 5,651,946 A | 7/1997 | Dekumbis et al. |
| 5,693,294 A | 12/1997 | Anderson et al. |
| 5,693,877 A | 12/1997 | Ohsuga et al. |
| 5,714,228 A | 2/1998 | Beckmeyer et al. |
| 5,782,089 A | 7/1998 | Machida et al. |
| 5,814,285 A | 9/1998 | Kojima et al. |
| 5,857,326 A | 1/1999 | Blanchet |
| 5,857,328 A | 1/1999 | Blanchet et al. |
| 5,866,079 A | 2/1999 | Machida et al. |
| 5,916,133 A | 6/1999 | Buhrmaster et al. |
| 5,916,134 A | 6/1999 | Yang et al. |
| 5,943,771 A | 8/1999 | Schmitt |
| 5,987,885 A | 11/1999 | Kizer et al. |
| 6,024,928 A | 2/2000 | Foster |
| 6,077,483 A | 6/2000 | Locker et al. |
| 6,086,829 A | 7/2000 | Shea et al. |
| 6,101,714 A | 8/2000 | Schmitt |
| 6,159,429 A | 12/2000 | Bemel |
| 6,162,403 A | 12/2000 | Foster et al. |
| 6,162,404 A | 12/2000 | Tojo et al. |
| 6,203,764 B1 | 3/2001 | Benson |
| 6,227,699 B1 | 5/2001 | Wight, Jr. |
| 6,317,976 B1 | 11/2001 | Aranda et al. |
| 6,389,693 B1 | 5/2002 | Aranda et al. |
| 6,391,421 B1 | 5/2002 | Bruck et al. |
| 6,438,839 B1 | 8/2002 | Hardesty et al. |
| 6,464,947 B2 | 10/2002 | Balland |
| 6,484,397 B1 | 11/2002 | Collins et al. |
| 6,641,785 B1 | 11/2003 | Neufert et al. |
| 6,667,013 B1 | 12/2003 | Nilsson |
| 6,689,328 B1 | 2/2004 | Otani et al. |
| 6,732,507 B1 | 5/2004 | Stanglmaier et al. |
| 6,810,660 B2 | 11/2004 | Hepburn et al. |
| 6,821,491 B1 | 11/2004 | Bruck et al. |
| 6,855,298 B2 | 2/2005 | TenEyck |
| 6,858,193 B2 | 2/2005 | Ruwisch et al. |
| 6,946,013 B2 | 9/2005 | Alward et al. |
| 7,111,392 B2 | 9/2006 | Irie et al. |
| 7,210,287 B2 | 5/2007 | Bolander et al. |
| 7,318,954 B2 | 1/2008 | Aoki |
| 7,334,334 B2 | 2/2008 | Lancaster et al. |
| 7,624,570 B2 | 12/2009 | Reuter et al. |
| 7,799,298 B2 | 9/2010 | Pfeifer et al. |
| 7,807,120 B2 | 10/2010 | Hansen et al. |
| 8,071,505 B2 | 12/2011 | Ebener et al. |
| 8,277,743 B1 * | 10/2012 | Ramberg ............. B01J 19/2485  422/129 |
| 8,477,676 B2 | 7/2013 | Song et al. |
| 8,679,433 B2 | 3/2014 | Yin et al. |
| 8,975,204 B2 | 3/2015 | Hori et al. |
| 9,108,156 B2 | 8/2015 | Plati et al. |
| 9,202,878 B2 | 12/2015 | Tak et al. |
| 9,243,540 B2 | 1/2016 | Hashimoto |
| 9,273,578 B2 | 3/2016 | Seyler et al. |
| 9,328,682 B2 | 5/2016 | Hoyer et al. |
| 9,352,310 B2 | 5/2016 | Aoki et al. |
| 9,358,534 B2 | 6/2016 | Bono et al. |
| 9,533,299 B2 | 1/2017 | Qi et al. |
| 2001/0036432 A1 | 11/2001 | Hu et al. |
| 2001/0037643 A1 | 11/2001 | Kubo et al. |
| 2004/0001781 A1 | 1/2004 | Kumar et al. |
| 2004/0005250 A1 | 1/2004 | Fischer et al. |
| 2004/0009106 A1 | 1/2004 | Galligan et al. |
| 2004/0076794 A1 | 4/2004 | Hijikata |
| 2004/0182069 A1 | 9/2004 | Goralski, Jr. |
| 2005/0069469 A1 | 3/2005 | Fu et al. |
| 2005/0150222 A1 | 7/2005 | Kalish et al. |
| 2005/0247038 A1 | 11/2005 | Takahashi |
| 2006/0168948 A1 | 8/2006 | Xu et al. |
| 2006/0272153 A1 | 12/2006 | Bowman et al. |
| 2007/0110650 A1 | 5/2007 | Pfeifer et al. |
| 2008/0132405 A1 | 6/2008 | Patchett et al. |
| 2008/0317999 A1 | 12/2008 | Patchett et al. |

(56) References Cited

U.S. PATENT DOCUMENTS

| | | |
|---|---|---|
| 2010/0166628 A1 | 7/2010 | Soeger et al. |
| 2011/0033343 A1* | 2/2011 | Fernandes, Jr. ......... C04B 30/02 422/168 |
| 2013/0045148 A1 | 2/2013 | Chivilikhin et al. |
| 2013/0213018 A1 | 8/2013 | Yin et al. |
| 2015/0078969 A1 | 3/2015 | Muter et al. |
| 2015/0125354 A1 | 5/2015 | Aoki et al. |
| 2015/0240690 A1 | 8/2015 | Choi |
| 2015/0306543 A1 | 10/2015 | Szczepanski |
| 2015/0337711 A1 | 11/2015 | Plati et al. |
| 2015/0352510 A1 | 12/2015 | Rizzi et al. |
| 2015/0352523 A1 | 12/2015 | Aoki et al. |
| 2015/0354426 A1 | 12/2015 | Crawford et al. |
| 2015/0354427 A1 | 12/2015 | Yamamoto et al. |
| 2015/0375204 A1 | 12/2015 | Aoki et al. |
| 2015/0375206 A1 | 12/2015 | Aoki |
| 2016/0061081 A1 | 3/2016 | Ogimura et al. |
| 2016/0074855 A1 | 3/2016 | Qi et al. |
| 2016/0102591 A1 | 4/2016 | Kayanuma et al. |
| 2016/0115843 A1 | 4/2016 | Mutsuda et al. |
| 2016/0144317 A1 | 5/2016 | Orehovsky et al. |
| 2017/0007985 A1 | 1/2017 | Bauer et al. |

OTHER PUBLICATIONS

University of Oslo, Flow in pipes, chapter 8; p. 321 See attached.

Phillip M. Ligrani; A Study of Dean Vortex Development and Structure in a Curved Rectangular Channel With Aspect Ratio of 40 at Dean Numbers up to 430. See attached.

Sameh M. Metwalley, et al.; Determination of the catalytic converter performance of bi-fuel vehicle. See attached.

Mansour Masoudi, "Pressure Drop of Segmented Diesel Particulate Filters." J. Fuels and Lubricants, Society of Automotive Engineers Transactions, vol. 114, (2005). Attached.

Mansour Masoudii, Collision of a vortex with a vaporizing droplet. International J. Multiphase Flow. vol. 26. Issue 12. pp. 1925-1949. 2000. Attached.

Mansour Masoudii, "Hydrodynamics of Diesel Particulate Filters", J. Fuels and Lubricants, Society of Automotive Engineers Transactions, vol. 111, 443-457 (2002). Attached.

Mansour Masoudi, "Vortex motion influencing sphere heating—Reynolds analogy revisited" Intl. J. Heat Mass Transfer. vol. 42, pp. 3529-3531 (1999).

* cited by examiner (a)
(Prior art)

CATALYTIC CONVERTERS HAVING NON-LINEAR FLOW CHANNELS

RELATED APPLICATION DATA

This application claims benefit of Provisional U.S. Application No. 62/270,532 filed Dec. 21, 2015, which is incorporated herein by reference

STATEMENT OF GOVERNMENT SPONSORSHIP

The present invention was partly made with funding from the US Department of Energy under grant No. DE-SC0015946. The US Government may have certain rights to this invention.

FIELD

The present invention relates in general to catalytic converters and, in particular, to non-linear catalyst support cores.

BACKGROUND

A major cause of atmospheric pollution is from mobile sources emitting noxious gases from internal combustion engines. Chief among the pollutants are nitrogen oxides (NOX) and hydrocarbons (HC), carbon monoxide (CO) and volatile organic compounds (VOC). A catalytic converter functions to reduce the levels of NOX and CO, HC and other pollutants in the engine exhaust gases. Catalytic converters render toxic NOX and CO, HC into harmless compounds such as $CO_2$, $N_2$ and water. Catalytic converters are used as emission control devices to reduce toxic exhaust gases emitted from internal combustion engines, such as in automobiles, trucks, diesel-electric "genset" locomotives, agricultural and construction machinery, and marine vessels. Non-linear (non-straight) geometric channels differ from conventional linear (straight) channels because exhaust gases or liquids transport differently to the surface of a solid catalyst coated onto channel walls. Non-linear geometric catalytic converters may have significant beyond just automotive applications in industrial and scientific fields as well, including chemical and petrochemical refinery processes and in producing pharmaceuticals, agrochemicals, fine chemicals, food flavorings, aromatic perfumes and fragrances, and dietary supplements, among other uses.

Most automotive catalytic converters include a honeycomb substrate core that is coated with a known catalyst formulation applied to the substrate core, sometimes containing a metal oxide washcoat. Most ceramic substrate cores contain linear channels with square cross sections. E.g. see U.S. Pat. Nos. 3,790,654 and 5,866,079 Metallic honeycomb substrate cores may have different channel cross sectional shapes because of the malleability of metal. Metal substrate cores may be formed as linear parallel, U-shaped channels with the catalyst embedded in the washcoat on the walls of the channels. The substrate core is wrapped in a retaining mat and is packaged in a protective outer metal shell. E.g., U.S. Pat. No. 8,071,505 issued to Ebener et al. discloses a metallic catalytic converter support body with a longitudinal axis containing a honeycomb body and housing. The honeycomb body has at least three metal layers arranged one above the other, which are wound with their end surfaces in each case starting from a common center into layers lying one above the other in a spiral form in a sleeve of the housing. The metal layers are developed as a corrugated sheath that creates straight and parallel channels through which exhaust flows.

The conventional design of a catalytic converter relies on a substrate core that is composed of hundreds or thousands of thin, narrow, long, and identical-sized duct-like channels or cells in a honeycomb-like structure. Each flow channel is typically several inches long, with channel openings, each roughly $1/20^{th}$ of an inch (about one millimeter) in diameter. Channel length and channel opening may vary depending on the catalytic substrate selected for a particular application. Exhaust flow through conventional linear channels is predominantly laminar. During exhaust flow, toxic compounds such as CO, NOX, and HC diffuse across the flow and react with the catalyst coated on the channel walls and are detoxified to $CO_2$, $N_2$, and $H_2O$. Diffusion is the dominant mode of species transport across flow streamlines for catalytic reactions in conventional catalytic honeycomb substrate cores. Thus catalytic reactions are rate-limited by overall diffusion coefficients. Furthermore, the reactant concentration gradient in the exhaust flow is generally higher in the bulk flow, especially near the channel centerline, and is lower near the channel walls (i.e., near the catalytic coating). thus imposing a certain limit on catalytic efficiency in linear channels. One may increase catalytic efficiencies inter alia by offsetting the rate-limiting step of diffusion by increasing the length of the honeycomb channels or by increasing the number of flow channels per honeycomb or by increasing the density of catalytic substrate material embedded in the washcoat. However, the downside to these measures would be to increase the weight of honeycomb and increase packaging size, and escalate the overall cost of manufacture. The instant disclosure offers an alternate cost saving approach to increase catalytic efficiencies. The current disclosure aims to increase catalytic efficiencies of converters by utilizing non-linear substrate core channels that can generate flow vortical forces that increase diffusion and convection across flow channels. The current disclosure includes non-linear channel geometries that increase catalytic efficiencies compared to conventional linear substrate channels.

SUMMARY

The disclosure presents non-linear geometries of flow channels in honey comb catalytic converters. One embodiment includes a non-linear honeycomb catalyst substrate core having helical flow channels. The honeycomb comprises a series of parallel flow channels along its longitudinal axis. Each flow channel is longitudinally formed into a helix within which secondary flows such as vortices of flows occur. These vortical flows are normally absent in linear channels. In another embodiment, a washcoat, within which the catalyst is embedded, is applied over the catalyst substrate. The honeycomb has a mat cover that forms a skin over the honeycomb. In yet another embodiment, a protective housing is formed as an outer shell over the catalyst substrate. The housing has an inlet and an outlet on opposite ends of the catalyst substrate. The inlet and outlet define entry and exit ports for exhaust gases entering and leaving the catalytic core.

A further embodiment includes a non-linear honeycomb catalyst substrate core having sinusoidal flow channels. The honeycomb includes a series of parallel flow channels along its longitudinal axis of symmetry. Each flow channel is longitudinally formed into a sinusoid within which secondary flows known as vortices occur. These vortical flows are normally absent in linear channels. In another embodiment, a washcoat, within which the catalyst is embedded, is applied over the catalyst substrate. The honeycomb has a mat cover that forms a skin over the honeycomb. In yet another embodiment, a protective housing is formed as an outer shell over the catalyst substrate. The housing has an inlet and an outlet on opposite ends of the catalyst substrate. The inlet and outlet define entry and exit ports for exhaust gases entering and leaving the catalytic core.

An embodiment includes a non-linear honeycomb catalyst substrate core having helical plus sinusoidal flow channels. The honeycomb includes a series of parallel flow channels along its longitudinal axis of symmetry. Each flow channel is longitudinally formed into a helix plus sinusoid within which secondary flows known as vortices occur. These vortical flows are normally absent in linear channels. In another embodiment, a washcoat, within which the catalyst is embedded, is applied over the catalyst substrate. The honeycomb has a mat cover that forms a skin over the honeycomb. In yet another embodiment, a protective housing is formed as an outer shell over the catalyst substrate. The housing has an inlet and an outlet on opposite ends of the catalyst substrate. The inlet and outlet define entry and exit ports for exhaust gases entering and leaving the catalytic core.

Still another embodiment includes a tandemly contiguous helical and sinusoidal configurations or superposed combination of helical as well as sinusoidal configuration of catalytic substrate channels. This geometry is referred to as helical plus sinusoidal (or vice versa) feature. This feature may include helical channels having sinusoidal channel walls, among other things. The honeycomb includes a series of parallel flow channels along a longitudinal axis of the catalyst substrate core. Each flow channel is longitudinally formed into a helix or a sinusoid or a combination helix plus sinusoid within which secondary flows known as vortices occur. These vortical flows are normally absent in linear channels. In another embodiment, a washcoat, within which the catalyst is embedded, is applied over the catalyst substrate. The honeycomb has a mat cover that forms a skin over the honeycomb. In yet another embodiment, a protective housing is formed as an outer shell over the catalyst substrate. The housing has an inlet and an outlet on opposite ends of the catalyst substrate. The inlet and outlet define entry and exit ports for exhaust gases entering and leaving the catalytic core.

Yet another embodiment includes a method for manufacturing a ceramic non-linear catalyst having helical flow channels. A die perforated with a lattice is provided over an outlet of a tube extrusion material feed pipe. Soft ceramic materials are forcibly extruded through the die whilst the die motion is up and down at a given rate along its axis of symmetry. Following the extrusion, the soft ceramic material is trimmed into a length suitable for a catalytic substrate core. The soft ceramic materials are heat-cured to form the catalyst. The catalyst is covered with a washcoat that contains a catalytic formulation. Finally a mat is put on to cover the finished honeycomb catalyst core.

Another embodiment includes a method for manufacturing a ceramic non-linear catalyst having sinusoidal flow channels. A die perforated with a lattice is provided over an outlet of a tube extrusion material feed pipe. Soft ceramic materials are forcibly extruded through the die whilst the die motion is up and down at a given rate along its axis of symmetry. Following the extrusion, the soft ceramic material is trimmed into a length suitable for a catalytic substrate core. The soft ceramic materials are heat-cured to form the catalyst. The catalyst is covered with a washcoat that contains a catalytic formulation. Finally a mat is put on to cover the finished honeycomb catalyst core.

In yet another embodiment, a method includes manufacturing a ceramic non-linear catalyst having helical plus sinusoidal flow channels in alternating helical and sinusoidal forms in a contiguous manner. A die perforated with a lattice is provided over an outlet of a tube extrusion material feed pipe. Soft ceramic materials is forcibly extruded through the die whilst the die moves alternatingly in a rolling and an up and down (heaves) motion, at a given rate along die's axis of symmetry. Following the extrusion the soft ceramic materials are trimmed into a length suitable for a catalytic substrate core. The soft ceramic materials are heat-cured to form the catalyst. The catalyst is covered with a washcoat that contains a catalytic formulation. Finally a mat is put on to cover the finished honeycomb catalyst core.

A further embodiment includes a method for manufacturing a metallic non-linear catalyst substrate having helical flow channels. A metal sheet is pressed into a corrugated pattern that includes a plurality of parallel channels formed along a longitudinal axis of the pressed metal sheet. A plurality of the pressed metal sheets is stacked, all oriented along their respective longitudinal axes. Each of the pressed metal sheets is permanently affixed to each other into a block. The block is helically twisted along the longitudinal axes. The block is trimmed into a length suitable for a catalytic substrate core. The catalyst is covered with a washcoat that contains a catalytic formulation.

In an embodiment, a catalytic converter having non-linear flow channels includes a heat-exchanger that is operably coupled to the catalytic converter to control the temperature of the catalytic substrate so as to effectuate maximum catalytic efficiency;

The foregoing non-linear catalytic converters include the following benefits:

Higher Catalytic Efficiency: The proposed geometry enhances the efficiency of catalytic reactions due to vortices or similar secondary flow, which is usually absent in straight channels. Efficiency of flow channels may be improved using cross-sectional shapes selected from a group including circular, square, rectangular, polygonal, wavy and triangular.

Cost Savings: In some applications, the enhanced efficiency allows a reduction of substrate volume and density (downsizing). Substrate reduction is of considerable economic importance since many catalyst formulations are expensive, particularly when their formulations include precious metals (platinum, palladium, and rhodium). Downsizing allows non-negligible, multi-layered savings in costs of: (a) substrate, (b) catalyst washcoat, (c) catalyst precious metal(s), (d) catalytic coating process, (e) substrate packaging materials, (f) labor, as downsized substrate is easier to package and also fits on a platform such as a vehicle.

Energy Savings: Substrate downsizing means energy savings through two separate and compounding effects: (a) Smaller substrates have reduced backpressure; in many applications, backpressure reduction yields a saving in pumping power, such as fuel savings in vehicles' engines (the so-called 'fuel economy'). Further, downsizing allows (b) weight reduction, itself another independent means of energy saving, such as fuel savings in vehicles. Further, (c) when subjected to hot flow such as in automotive exhausts, vortical structures inside the substrate channel allow substrate to heat up (light off) faster, i.e. it reduces light-off time; most engines need to inject excess fuel to assist with heating during their cold-start; faster light-off allows reducing such injected fuel during cold-start.

Pollution Control: Engine emission is typically the highest during engine cold-start; this is known as bag-1 emission in engine certification. Faster substrate light-off lowers cold-start emissions.

Use in Heat Exchangers: The combined sinusoidal-helical geometry may be utilized in heat exchangers, where enhanced heating (or cooling) of the base, career flow is of interest, usually without any increase in pumping power.

The foregoing summary is not intended to be in any way limiting. In addition to the illustrative aspects, embodiments, further improved aspects, embodiments, and devices and methods will become apparent by reference to the drawings and the detailed description.

A person skilled in the art will recognize that the drawings and accompanying brief descriptions are illustrative without limitations and are not drawn to scale.

DETAILED DESCRIPTION

Emission controls in mobile internal combustion engines are an absolute necessity and an important governmental regulatory requirement for abating atmospheric pollution and climate change. The predominant method of achieving emission control of exhaust gases is through the use of catalytic converters in mobile transporters such as cars, trucks, boats, locomotives etc. Catalytic conversion involves the chemical reaction of exhaust fumes from internal combustion engines with catalysts embedded within the flow channels of the catalytic core of a catalytic converter that is installed in an automobile. Catalytic reaction rates and efficiencies may be significantly enhanced by increasing molecular interactions i.e., increasing the number of reactant collisions and by increasing residence time of exhaust gas molecules inside catalyst-coated substrate channel walls. This may be achieved by increasing reactive surface geometry of substrate channels. In conventional linear flow catalytic substrate channels the exhaust gas flow is normally laminar at slow and moderate gas flow rates. Thus catalytic reaction efficiencies within linear catalytic channels are rate-limited by the length of the channel and amount of catalyst substrate within channels at constant flow rates. However, using non-linear channel geometry one can practically achieve catalytic efficiencies that are greater than are possible with linear catalytic flow channels without the added cost of increasing the quantity of catalytic substrates or increasing catalytic core dimensions. One aspect of this disclosure includes using non-linear channel geometries such as helical or sinusoidal or a combination of the two as a means of increasing catalytic efficiencies. Yet another aspect includes using increased catalytic efficiencies to reduce honeycomb volume and to reduce aggregate costs of making the same Still another aspect includes the process of manufacturing catalytic cores having non-linear flow channels.

Figure 1:
FIG. 1 is an exemplary illustration of a single, representative, linear, helical and sinusoidal channel.
Figure 1:
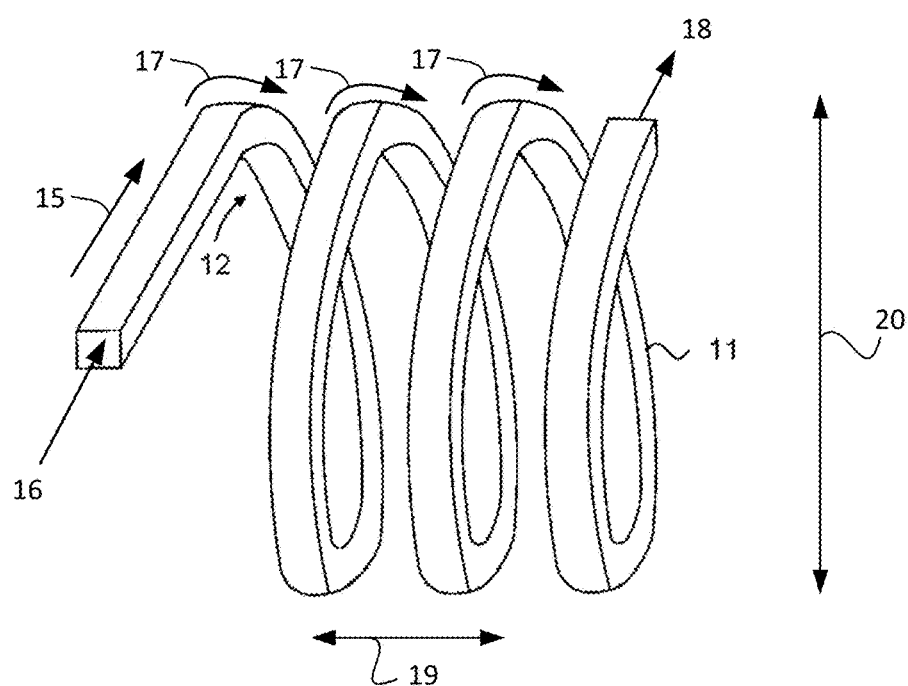
Figure 1:
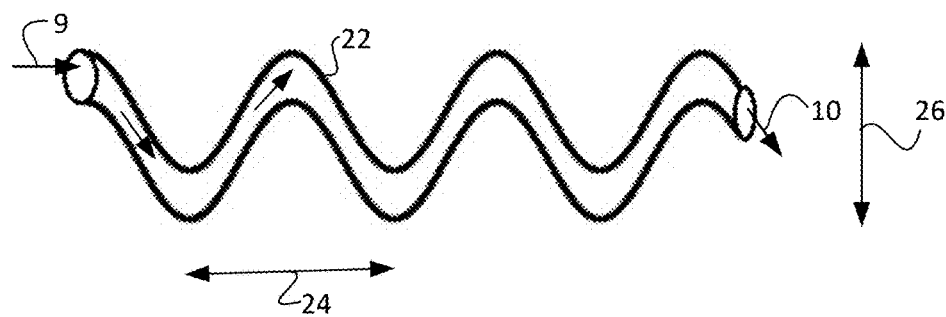

FIG. 1 illustrates a single, representative example of a linear channel and two other examples of non-linear channels. Here, linear means extending along a straight line. Non-linear means any geometrical configuration that is not extending straight or is not substantially straight. FIG. 1(a) shows a representation of a single linear channel generally used in prior art honeycomb catalytic substrate cores. Exhaust gases flow through an inlet opening 9 and travel in essentially in oped laminar flow 13 and exit through an outlet opening 10. FIG. 1(b) is an embodiment of a single channel having non-linear helical geometry 11. Depending on the shape, the entry section 12 of the helical channel may be linear 15 prior to the channel becoming helical; This type of entry 16 may allow an initial laminar flow pattern in the upstream flow. However, as the exhaust gas flow passes through the curvature 17 of the helical channel, the internal flow transitions into eddies and vortices giving way to strong secondary flows induced by centrifugal forces, known as vortices as the flow passes through the helix. Eddies are formed in the flow direction 17 in channels having helical shapes. In the embodiment in FIG. 1(b) there is shown a right-handed helix. However, those skilled in the art will realize that the flow vortices can occur similarly in left-handed helices. The rates of flow and the intensities of vortices may, among other things, depend on the pitch of the helix 19 (one complete turn) and the diameter of the helix 20.

Another embodiment of a non-linear catalyst substrate is a sinusoidal flow channel as depicted in FIG. 1(C). An exemplary single sinusoidal channel is shown in FIG. 1(c). The flow may enter through an inlet 9 and eddies may occur within the curvature 22 of the channel. Those skilled in the art will recognize that the nature of eddies in the sinusoidal channel geometry may be different from the vortices generated in the helical channels. Helical channels may be more prone to generating vortices than sinusoidal channels. Sinusoidal channels may come in different embodiments depending on the wave length 24 and the amplitude 26. By varying the wavelength 24 and the amplitude 26, one having skill in the art may achieve variations in flow rates of eddies through sinusoidal channels.

Figure 2:
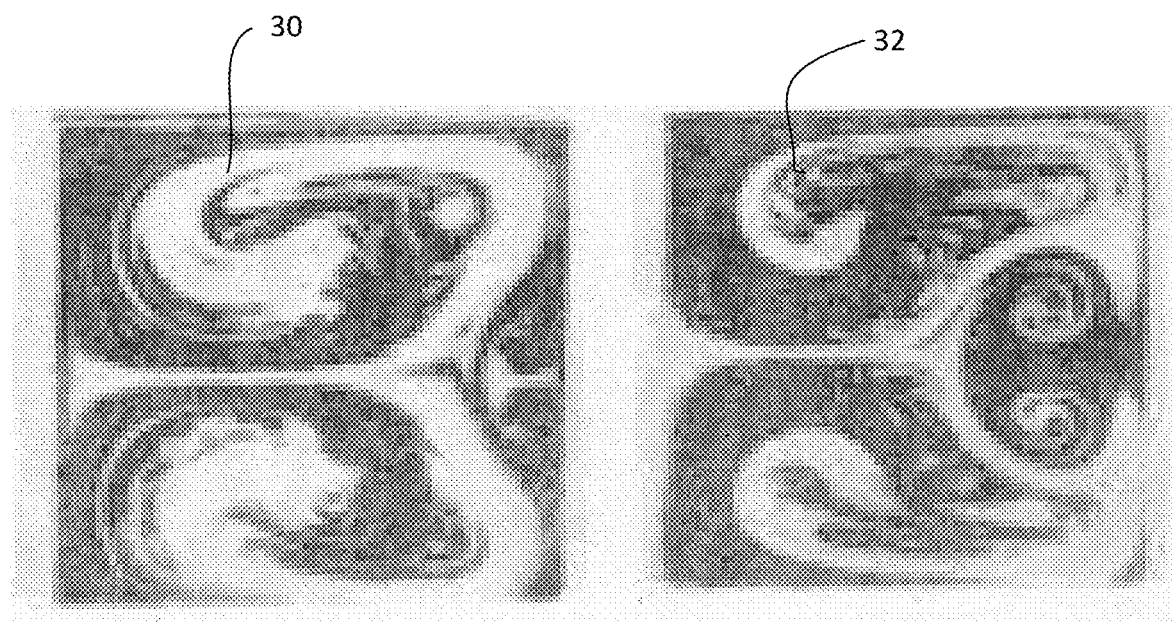
FIG. 2 is an exemplary illustration of a cross-sectional view of counter-rotating vortices.

FIG. 2 is an illustration showing, by way of examples, a cross-sectional view of vortex flows 30, 32. The vortices 30, 32 enhance heat and mass transfer, which in turn translate into an increase in catalytic efficiency. Vortices formed in helical channels may augment flow interactions with the channel walls, for instance they enhance heat and mass transfer such as in heat exchangers. Those skilled in the art will recognize that sinusoidal and helical channels can produce vortices as illustrated in FIG. 2. In helical channels, vortices provide a secondary flow lateral to the base flow, enhancing the flux of flow species toward the channel walls, allowing increase in catalytic reactions and reaction efficiency, particularly at higher exhaust temperatures (i.e., faster kinetics).

Figure 3:
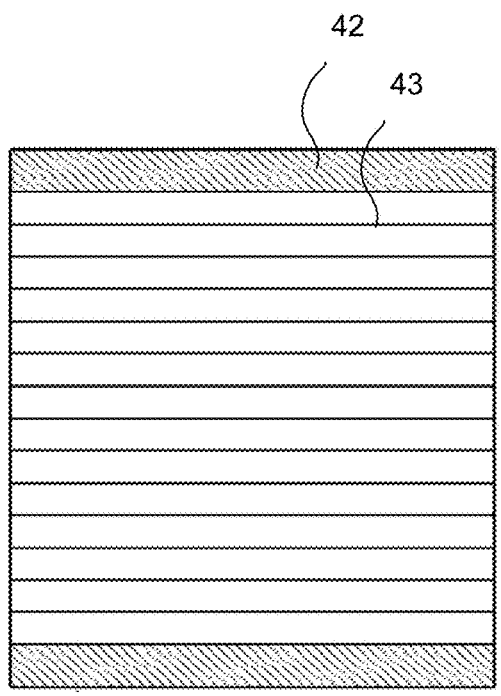
FIG. 3 is an exemplary illustration of longitudinal sectional views of the arrangement of non-linear channels.
Figure 3:
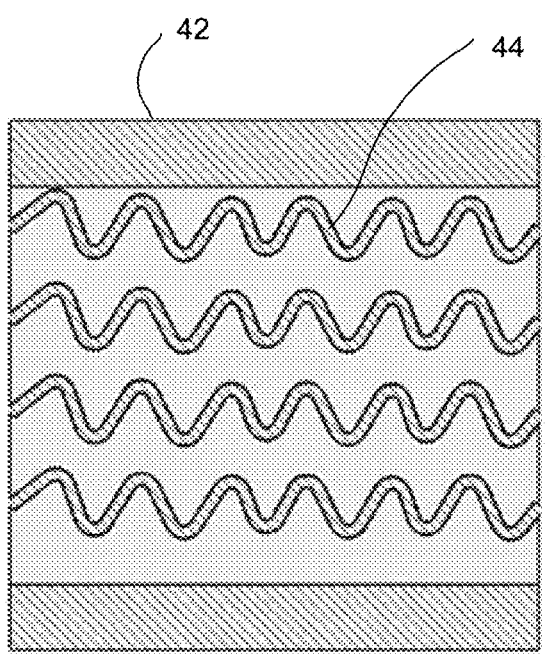
Figure 3:
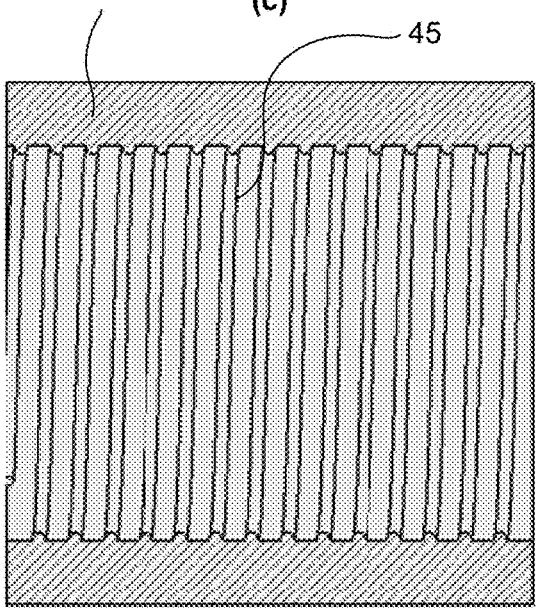
Figure 3:
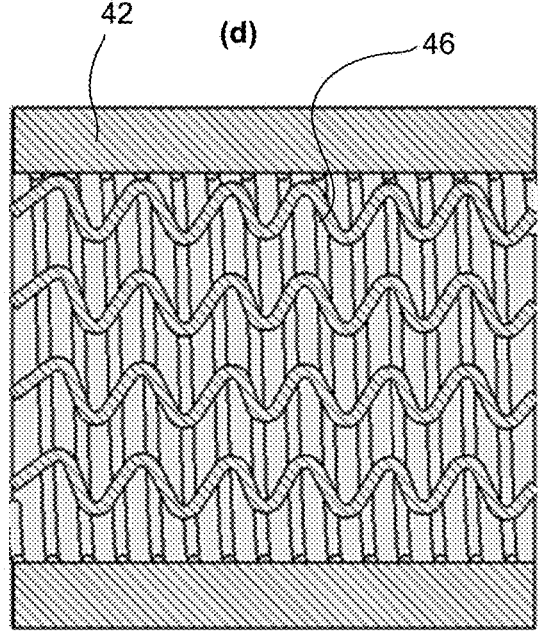

FIG. 3 is a conceptual illustration of a portion of a honeycomb catalyst showing multiple linear channels (FIG. 3(a); prior art), sinusoidal channels (FIG. 3(b)) or helical channels (FIG. 3(c)) or superposed combination of sinusoidal and helical channels (FIG. 3(d)), i.e., helical plus sinusoidal configuration. Helical plus sinusoidal configuration includes, but is not limited to, helical flow channels having sinusoidal shaped channel walls or tandemly repeated sinusoidal flow channels alternating with helical flow channels (or vice versa), all non-linear channels juxtaposed in a contiguous manner or a single catalytic core having a combination of helical and sinusoidal channels.

Those skilled in the art will recognize that a typical honeycomb catalyst core has between 500 to 1000 channels within the honeycomb structure. However, for the sake of illustrative simplicity, only a few channels are illustrated in FIG. 3. The typical ceramic honeycomb catalyst includes a wrap around mat cover 42 that forms a skin over the honeycomb. The channels are arranged parallel to each other either in the linear channel configuration 43 (prior art) or sinusoidal mode 44 or helical mode 45 or a superposed combination of sinusoidal and helical mode 46. Person having skill in the art will recognize that FIG. 3 shows simplified cut-away views of honeycomb structure for illustrative purposes. Other views of non-linear channels are within the scope of this disclosure.

Figure 4:
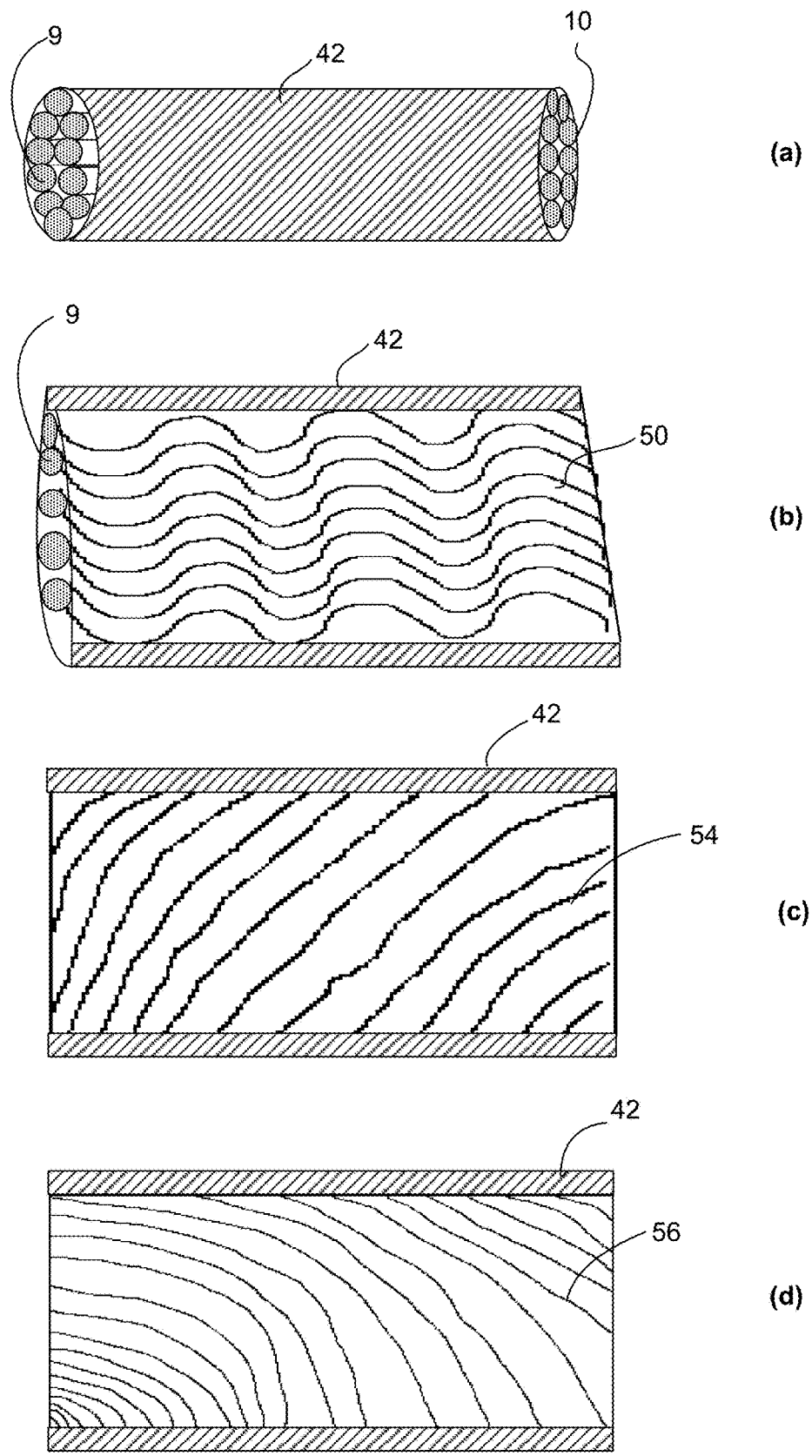
FIG. 4 is an exemplary illustration of a honeycomb and longitudinal sectional views of the arrangement of non-linear channels.

In a different embodiment, FIG. 4(a) illustrates a typical cylindrical-shaped honeycomb structure found in many catalyst cores. The catalytic core comprises a mat cover 42 and hundreds of substrate channels (only a few are shown here for simplicity) that are arranged parallel to the long axis. The channels have an exhaust gas inlet opening 9 and an outlet 10. In an embodiment, FIG. 4(b) shows a partial longitudinal cut-away conceptual perspective view of a honeycomb structure with mat cover 42 and sinusoidal channels 50. Exhaust gas inlet openings 9 are arranged as a parallel stack, just as in a typical honeycomb catalyst core. The cut-away perspective reveals the interior of the sinusoidal channels 50.

FIG. 4(c) shows a partial longitudinal cut-away conceptual perspective view of a honeycomb structure with mat cover 42 and helical channels. This figure shows a conceptual view of a series ribs 54 representing one half of the helices as if the full helical channels were longitudinally sliced along their long axis of symmetry. The ribs are arranged as arcs representing each forward half-turn of a helix in a honeycomb catalyst core. The cut-away perspective reveals the interior of the channels as they would appear to an outside observer. FIG. 4(d) illustrates a complementary cut-away view to the one shown in FIG. 4(c) showing the ribs 56 of the half-helices as they appear backward. The views and concepts presented here are not to be construed as limiting in any way. One skilled in the art will recognize that other perspective views may be conceived and drawn that may show helical channels in different embodiments consistent with the scope of this disclosure.

Figure 5:
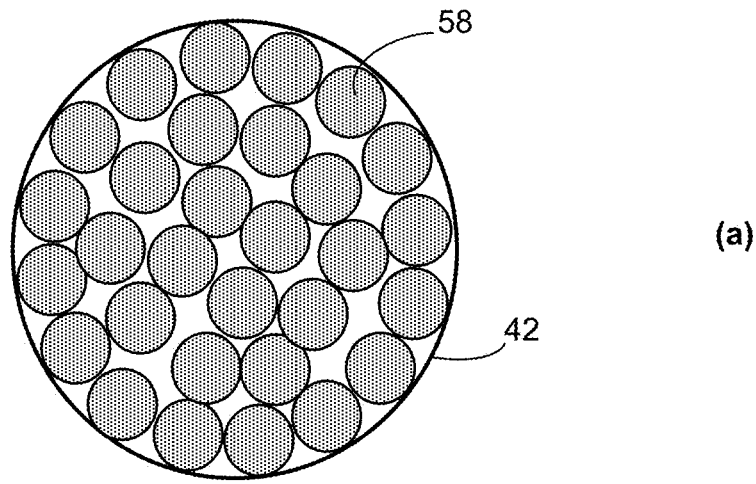
FIG. 5 is an exemplary illustration of a honeycomb flow cross-sectional view of circular channels, square channels and triangular channels. The gaps between illustrative flow cross-sections are not in actual designs of a honeycomb.
Figure 5:
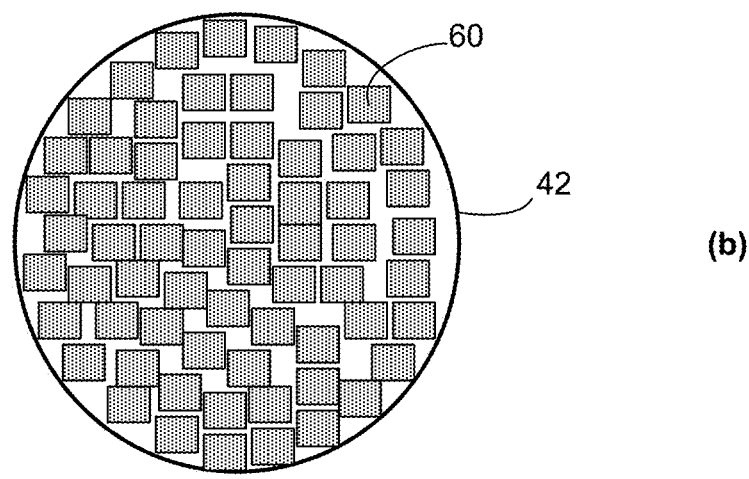
Figure 5:
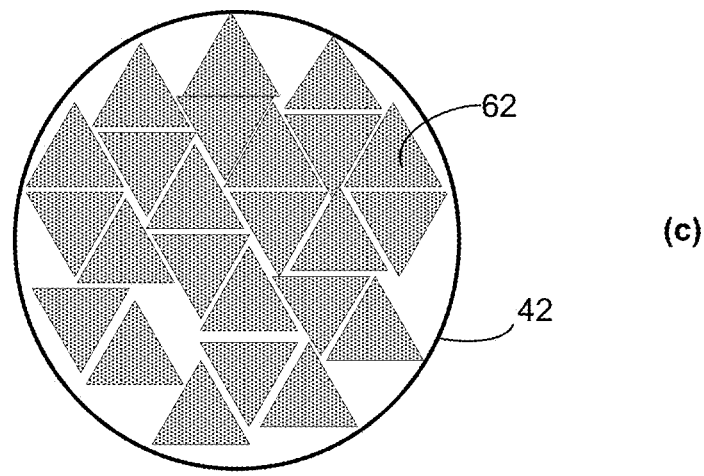

In one aspect of the disclosure, flow cross sections may be varied to alter the cross sectional shape and efficiency of a flow channel. That includes, but is not limited to, designing other types of flow cross sections. For instance, FIG. 5(a-c) shows embodiments of circular (a), square or rectangular (b) or triangular (c) flow cross sections of channels in a honeycomb catalyst. The outer circle represents the mat cover 42 of the honeycomb core commonly called the honeycomb skin. Some fluid flow characteristics in a circular channel are different from that of the square or rectangular duct type of flow cross section. For example, frictional force imposed by the flow on the interior walls of a triangular channel 62 is lower than the corresponding force in the square or rectangular flow channel 60 or in the circular 58 flow channel. Frictional force is the chief mechanism in producing the honeycomb pressure drop, which is a measure of honeycomb's resistance to an exhaust flow. Those skilled in the art will recognize that pressure drop is an important factor, among others, in the design preferences in the selection of a particular channel type. Geometric design parameters, such as total channel surface area may impact catalytic efficiency. It is important to balance a honeycomb's total catalyst surface area with its pressure drop. Design and modeling to gain a better understanding of optimal conditions for each application is covered within the scope of this disclosure. It is likely that catalytic efficiencies may differ for each type of non-linear channel design shown in FIG. 5.

Figure 6:
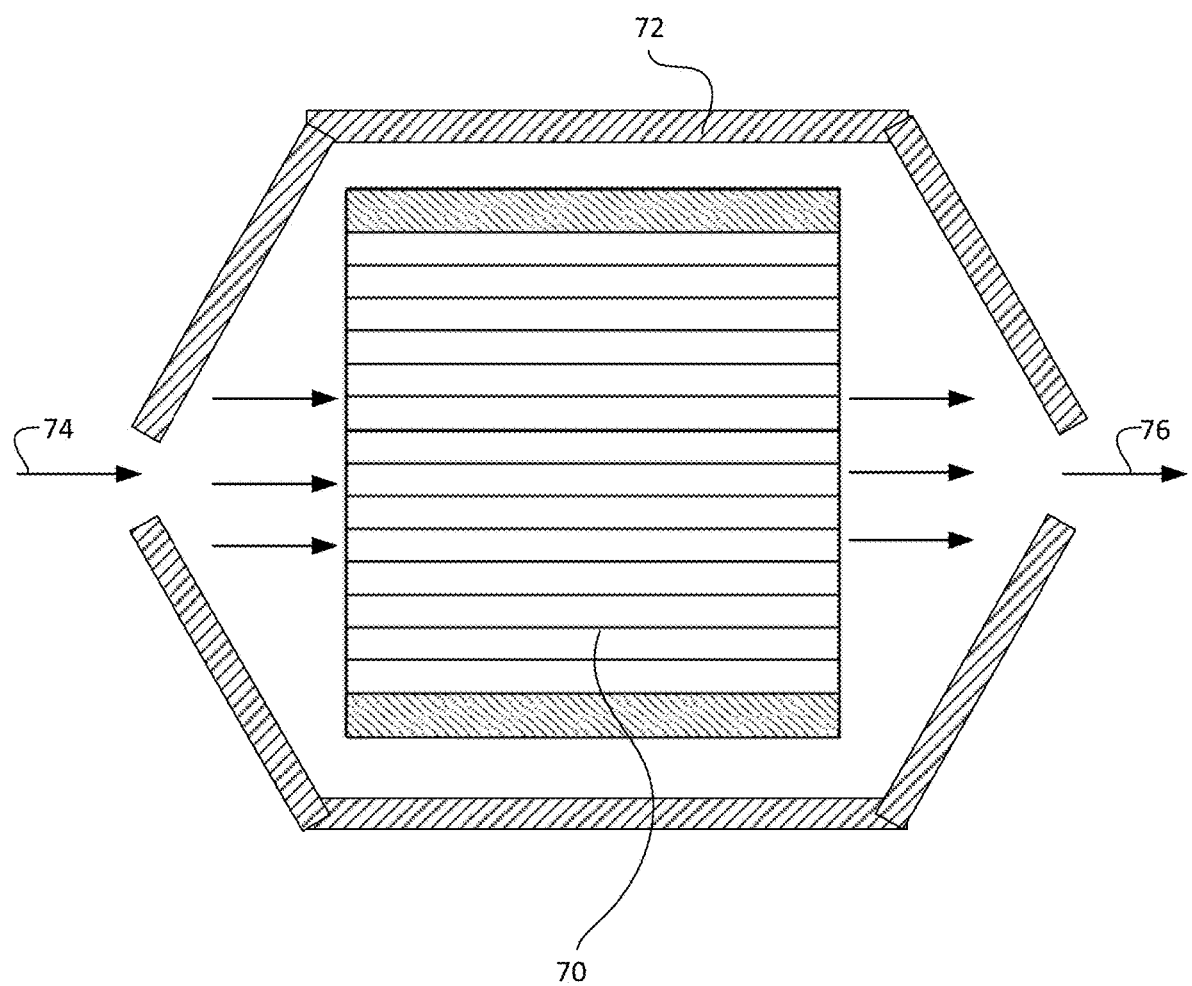
FIG. 6 is an exemplary illustration of longitudinal sectional view of a honeycomb having linear channels encased in a protective housing.
Figure 7:
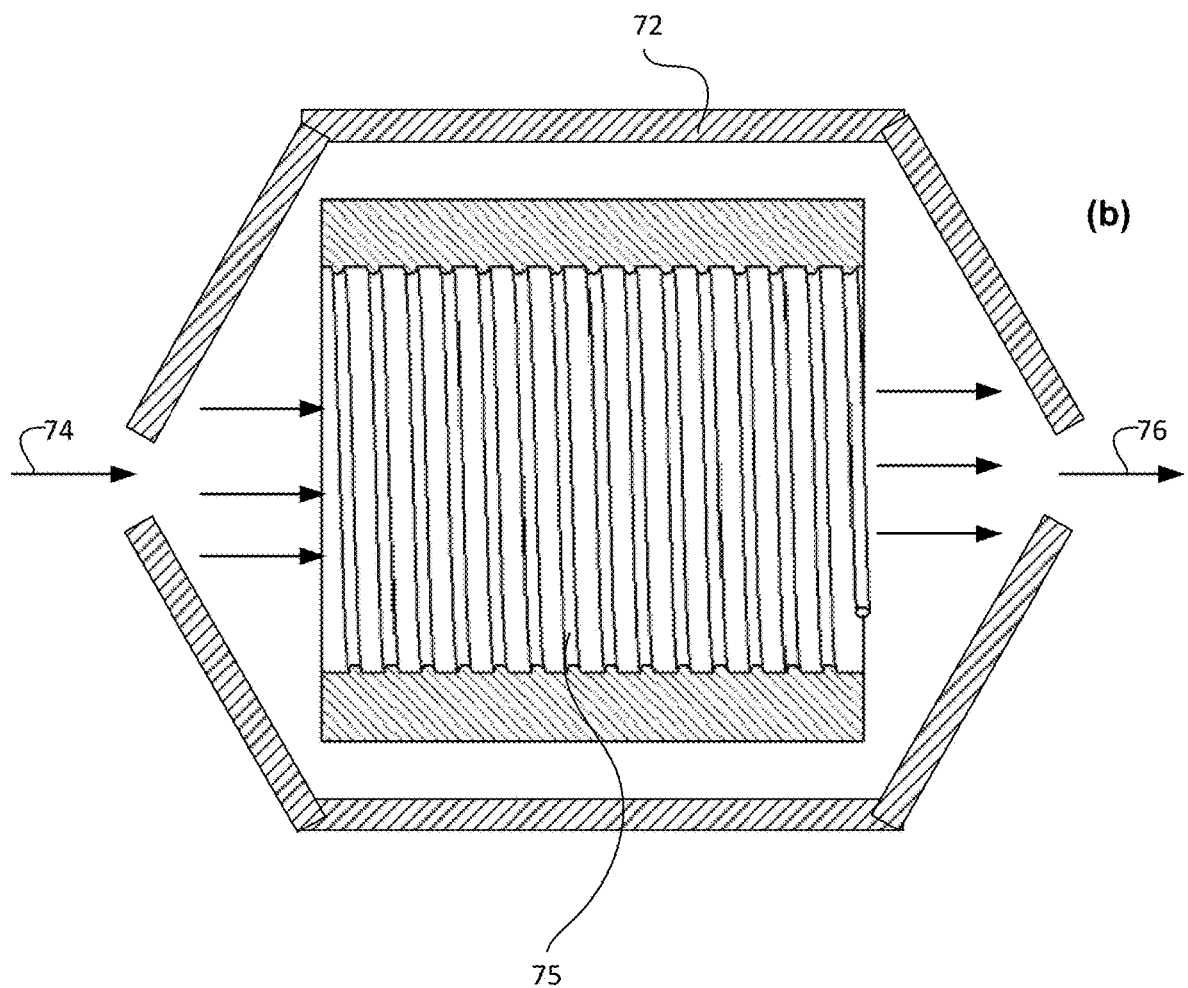
FIG. 7 is an exemplary illustration of longitudinal sectional view of a honeycomb having helical channels encased in a protective housing.
Figure 8:
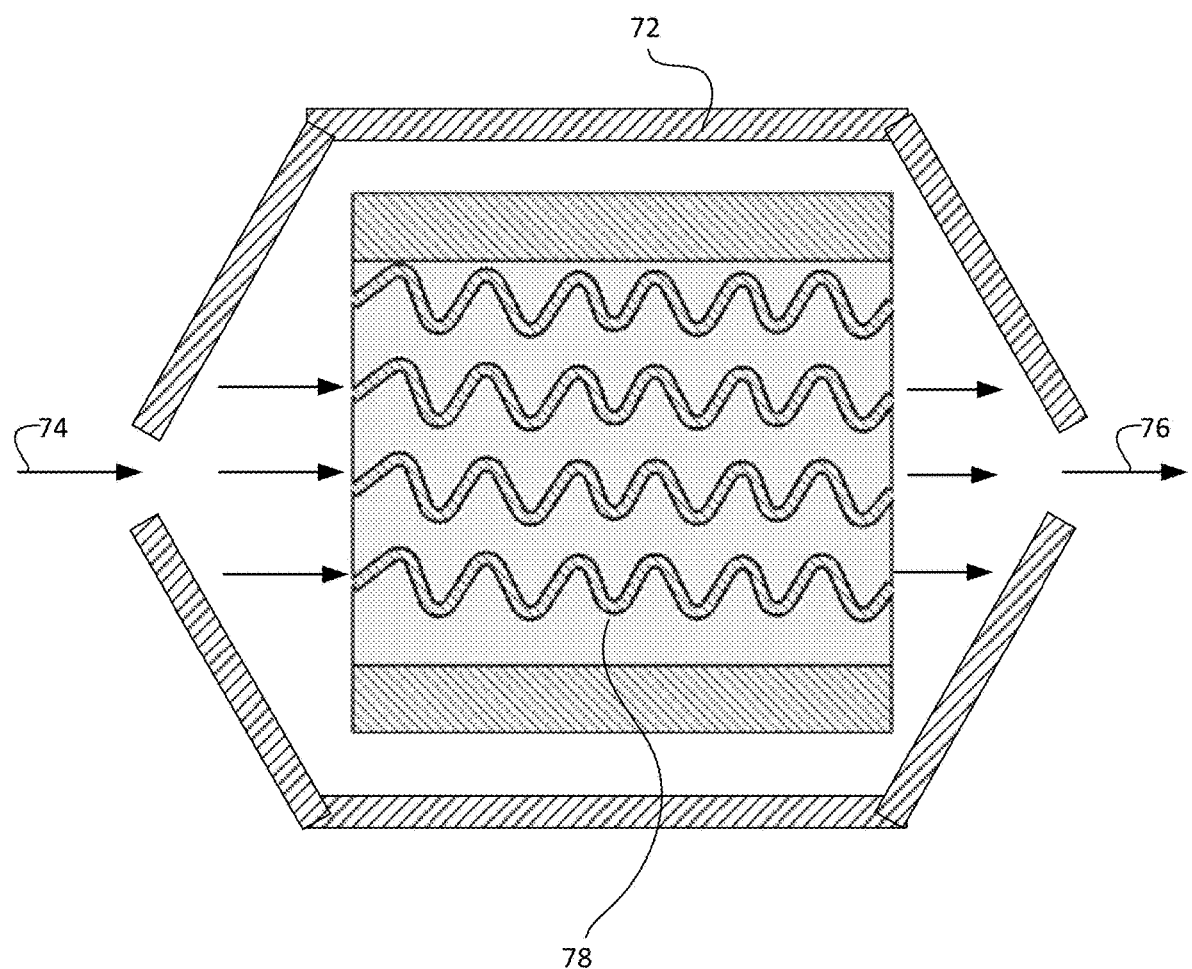
FIG. 8 is an exemplary illustration of longitudinal sectional view of a honeycomb having sinusoidal channels encased in a protective housing.
Figure 9:
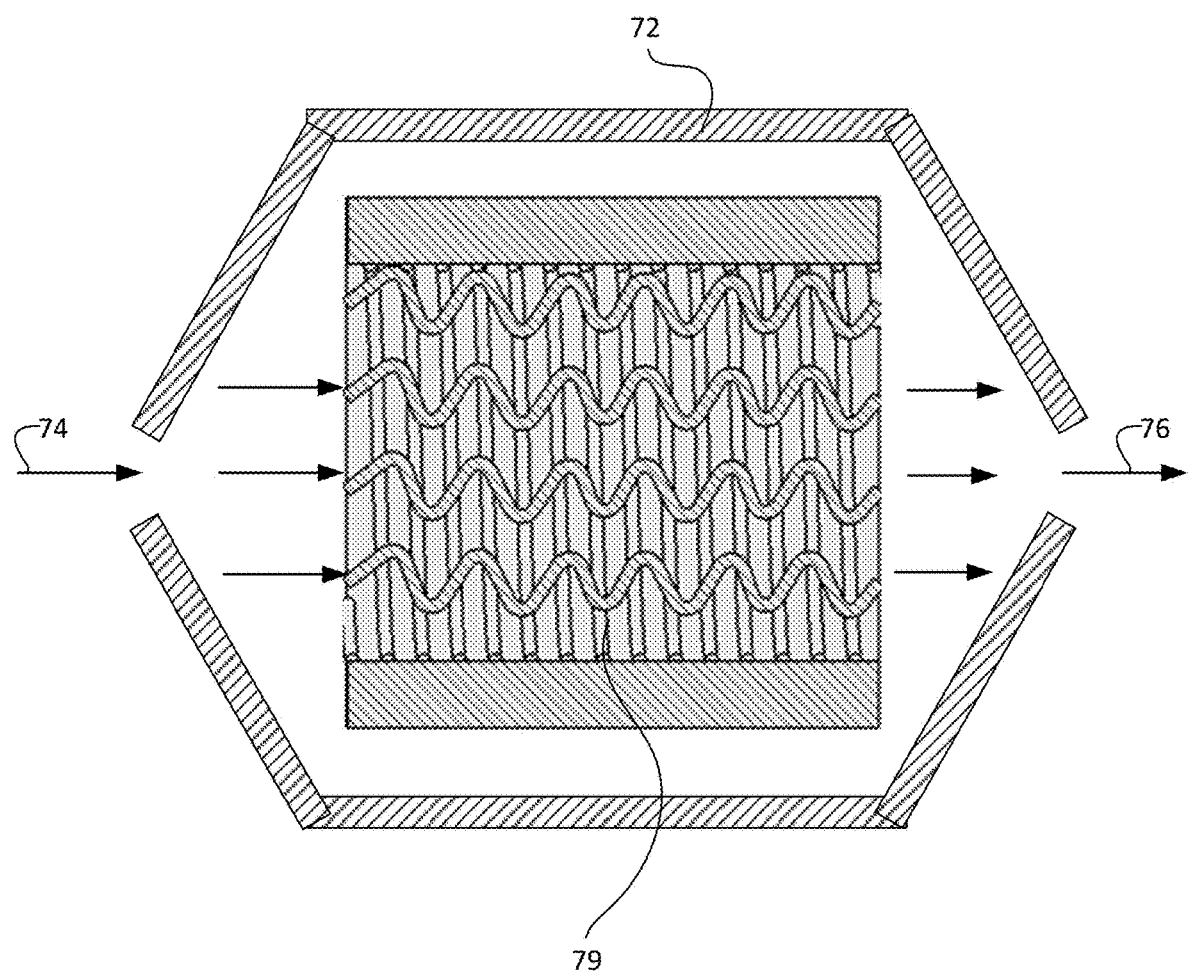
FIG. 9 is an exemplary illustration of longitudinal sectional view of a honeycomb having helical plus sinusoidal channels encased in a protective housing.

FIG. 6 illustrates an embodiment of the elements of a typical automotive application of catalytic converter. Those skilled in the art will recognize prior art as a whole (FIG. 6) includes a honeycomb catalytic converter with linear channels 70 normally enclosed in a, a protective metal housing 72. The metal housing has an inlet 74 for the entry of exhaust gases from engine ports and an outlet 76 for purified gases to exit. FIG. 6 illustrates a longitudinal section of a set up for the application of a catalytic converter having linear channels 70 in a honeycomb structure. Similarly, FIG. 7 illustrates a longitudinal section of a housing 72 containing a catalytic honeycomb having helical channels 75. There is illustrated in FIG. 7 a representation of a longitudinal section of a set up for application of a catalytic converter having helical channels 75 in the honeycomb structure. Likewise, FIG. 8 illustrates a representation of a longitudinal section of a housing 72 containing a catalytic honeycomb having sinusoidal channels 78. In a different embodiment, FIG. 9 illustrates a representation of a longitudinal section of a housing 72 containing a catalytic honey comb having a combination of helical plus sinusoidal channels 79. In accordance with a further embodiment, sinusoidal plus helical channels, either superposed or tandemly contiguous are expected to behave like hybrid channels (See FIG. 9). The helical and sinusoidal channels independently form secondary flow vortices. When the two helical and sinusoidal channel types are combined (i.e., helical plus sinusoidal) in a hybrid channel, the resultant structure forms cumulatively stronger secondary vortices compared to either a helical channel or a sinusoidal channel alone. This hybrid pattern of secondary flow continually carries the base flow toward the catalyst-coated channel walls, where heat and mass transfer, adsorption, desorption, reactions, filtration, and so forth, take place, thereby increasing overall catalytic efficiency.

The expected catalytic efficiencies for non-linear channels as disclosed herein may be in the range of 2-4 fold higher compared to linear channels. Design and modeling may provide further insights as to attainable catalytic efficiencies. Higher catalytic efficiencies are expected for helical channels because (1) the residence time of exhaust gas in non-linear channels is greater than that in linear channels with the same honeycomb length; (2) mass action in non-linear channels is greater due to increased residence time; (3) thermal dissipation is greater in helical channels than in linear or sinusoidal channels. Depending on the application, the number of helical turns (twists) per given channel length (i.e., winding number) controls the efficiency of catalysis in helical channels. Too many twists per inch may cause excessive pressure gradient through the catalytic substrate honeycomb and excessive backpressure in the engine ports leading to lesser catalytic efficiency. Too few twists may reduce catalytic efficiency because of insufficient pressure gradient across the helical channel. For each application, an optimal winding number may be arrived at through further experimentation and modeling by persons skilled in the art.

In an embodiment the catalytic converter includes a heat-exchanger operably coupled to the catalytic converter to control the temperature of the catalytic substrate so as to effectuate maximum catalytic efficiency.

Figure 10:
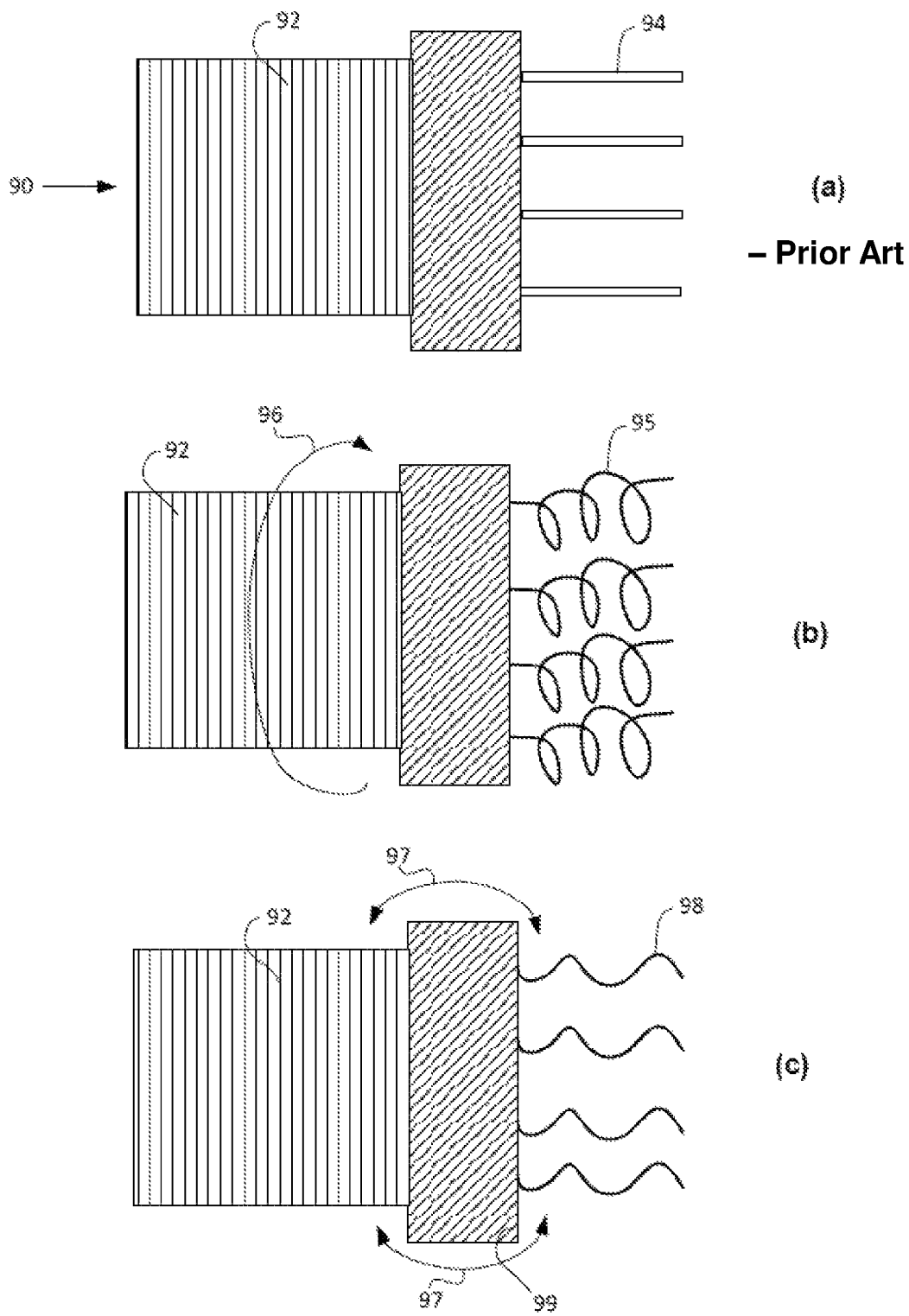
FIG. 10 is an exemplary illustration of an extrusion process of linear, helical and sinusoidal cells.

Currently, honeycomb substrate cores are manufactured using ceramic or metal. Ceramic substrate cores are usually manufactured through extrusion molding. E.g. U.S. Pat. Nos. 4,984,487; 5,108,176; and 5,322,537. FIG. 10 is diagrammatic representation of a die extrusion process for manufacturing ceramic linear and non-linear channels. During extrusion 90, soft ceramic material is forcibly pushed from the outlet of a tube. In this process, the ceramic material is continually fed through the honeycomb die 92. The die is perforated with a thin mesh or lattice that causes the soft ceramic material to form hundreds or thousands (for simplicity only a few are shown in FIG. 10) of thin, narrow, long, and identically-sized tube-like linear channels 94 or cells to extrude along the die's longitudinal axis of symmetry. This series of linear and parallel tube-like channels are characteristic of a honeycomb substrate catalyst. The honeycomb is trimmed to a length appropriate for a catalyst application and heat cured following extrusion. The heat-cured catalyst is covered with a washcoat that contains a catalyst formulation and packaged in a metal housing or shell.

The current disclosure improves on the prior art extrusion molding and die system in FIG. 10(a) to manufacture ceramic substrates having helical channels. FIG. 10(b) illustrates an extrusion molding die system for forming helical flow channels 95. During extrusion, the die 92 is rotated (rolling motion) at a given speed along its longitudinal axis of symmetry. The rotation causes the extruded soft ceramic material to form thin, narrow, long, and identically-sized tube-like channels 95 or cells that are wound along the die's longitudinal axis of symmetry in a manner similar to a helix. The speed of the rotation of the die 92 can be altered to produce the requisite number of helical turns per given substrate length.

In an alternative embodiment, the extrusion molding die system can be modified to manufacture ceramic substrate core having sinusoidal channels. FIG. 10(c) is an illustration showing an extrusion molding die 92 for forming a non-linear catalyst substrate having sinusoidal flow channels. During extrusion, the front plane 99 of the die 92 is oscillated up and down 97 like a sine-wave, at specified frequency and angular speed along its longitudinal axis of the die's symmetry, which causes the extruded soft ceramic material to form thin, narrow, long, sinusoidal channels 98 or cells that rise and fall along the die's longitudinal axis of symmetry in a manner similar to a sine wave. The angular speed and frequency of the oscillatory movements 97 of the front plane 99 of the die 92, will determine the shape (amplitude, wavelength) of sinusoidal channel 98 per given substrate length.

In yet another embodiment, the extrusion molding die system can also be modified to manufacture a ceramic substrate core having sinusoidal plus helical channels. The extrusion molding die 92 (in FIG. 10) may be modified to form non-linear catalyst substrate having sinusoidal plus helical flow channels. During extrusion, the front plane 99 of the die 92 may move both in a vertical up-down motion 97 in combination with the die front tilting up and down (or sideways) around a fixed pivotal axis like a sine wave, while the die 92 also rotates 96. Here, the die's longitudinal axis of symmetry assumes simultaneous sinusoidal and rotational motions, thereby causing the extruded soft ceramic material to form thin, narrow, long, and channels or cells that have sinusoidal shape while wound in a helical shape around the die's axis of symmetry. The frequency and angular speed of die's sinusoidal motion, and the speed of its rotation, will determine wavelength, amplitude and helical turns for any specified design (not shown separately as a FIG.).

Figure 11:
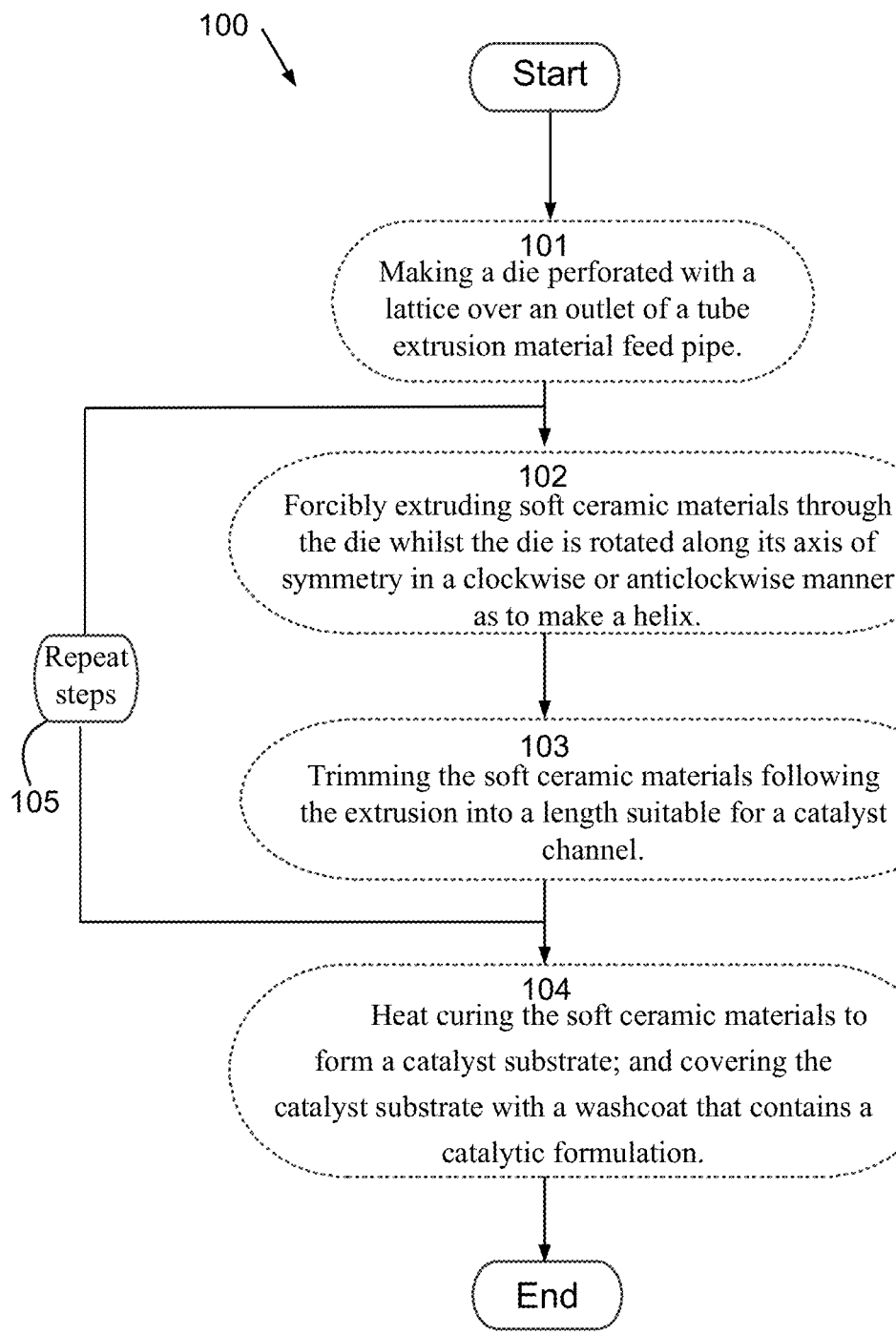
FIG. 11 is an exemplary illustration of a process for manufacturing helical channels.

The modern catalytic converters are made from ceramic material. E.g. U.S. Pat. Nos. 3,489,809, 5,714,228, 6,162,404, and 6,946,013. Catalytic substrate cores having non-linear channels, as disclosed herein, can be manufactured from ceramic material by improving prior art. Turning now to FIG. 11, there is presented an embodiment of a method 100 for manufacturing a ceramic honeycomb catalytic converter having helical flow channels, comprising the step 101 of making a die perforated with a lattice over an outlet of a tube extrusion material feed pipe; the step 102 of forcibly extruding soft ceramic materials through the die whilst the die is rotated along its axis of symmetry in a clockwise or anticlockwise manner as to make a helix' the step 103; of trimming the soft ceramic materials following the extrusion into a length suitable for a catalyst channel; and the step 104 of heat curing the soft ceramic materials to form a catalyst substrate; and covering the catalyst substrate with washcoat that contains a catalytic formulation. In a further embodiment, the steps 102, 103 in the foregoing method are repeated 105 to mass manufacture catalytic converters with helical channels.

Figure 12:
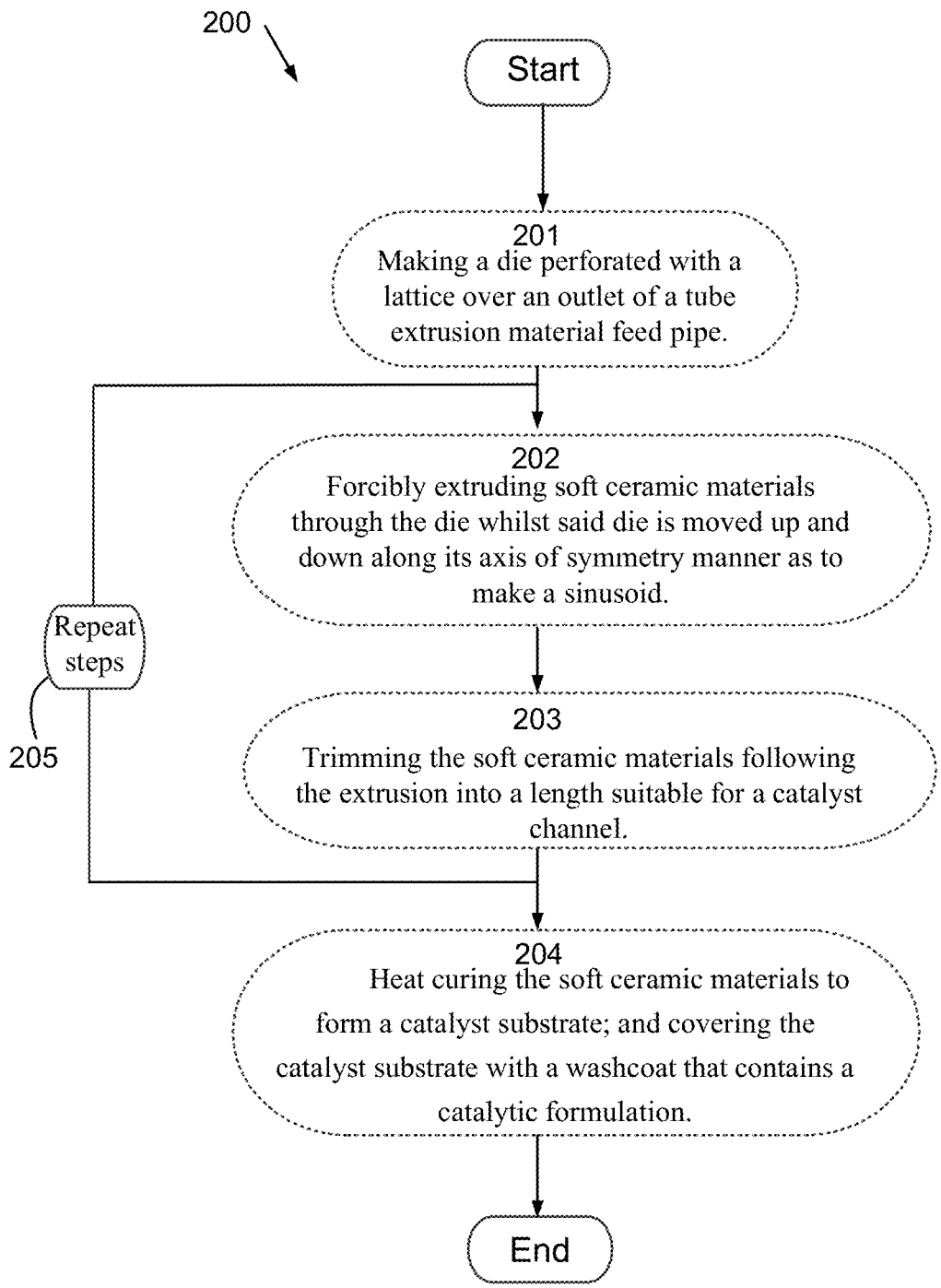
FIG. 12 is an exemplary illustration of a process for manufacturing sinusoidal channels.

In yet another embodiment, there is illustrated in FIG. 12 a method 200 for manufacturing a ceramic honeycomb catalytic converter having sinusoidal flow channels, comprising the step 201 of making a die perforated with a lattice over an outlet of a tube extrusion material feed pipe; the step 202 of forcibly extruding soft ceramic materials through the die whilst the die is moved up and down along its axis of symmetry as to make a sinusoid; the step 203; trimming the soft ceramic materials following the extrusion into a length suitable for a catalyst channel; and the step 204 of heat curing the soft ceramic materials to form a catalyst substrate; and covering the catalyst substrate with washcoat that contains a catalytic formulation. In a further embodiment, the steps 202, 203 in the foregoing method are repeated 205 to mass manufacture catalytic converters with sinusoidal channels.

Figure 13:
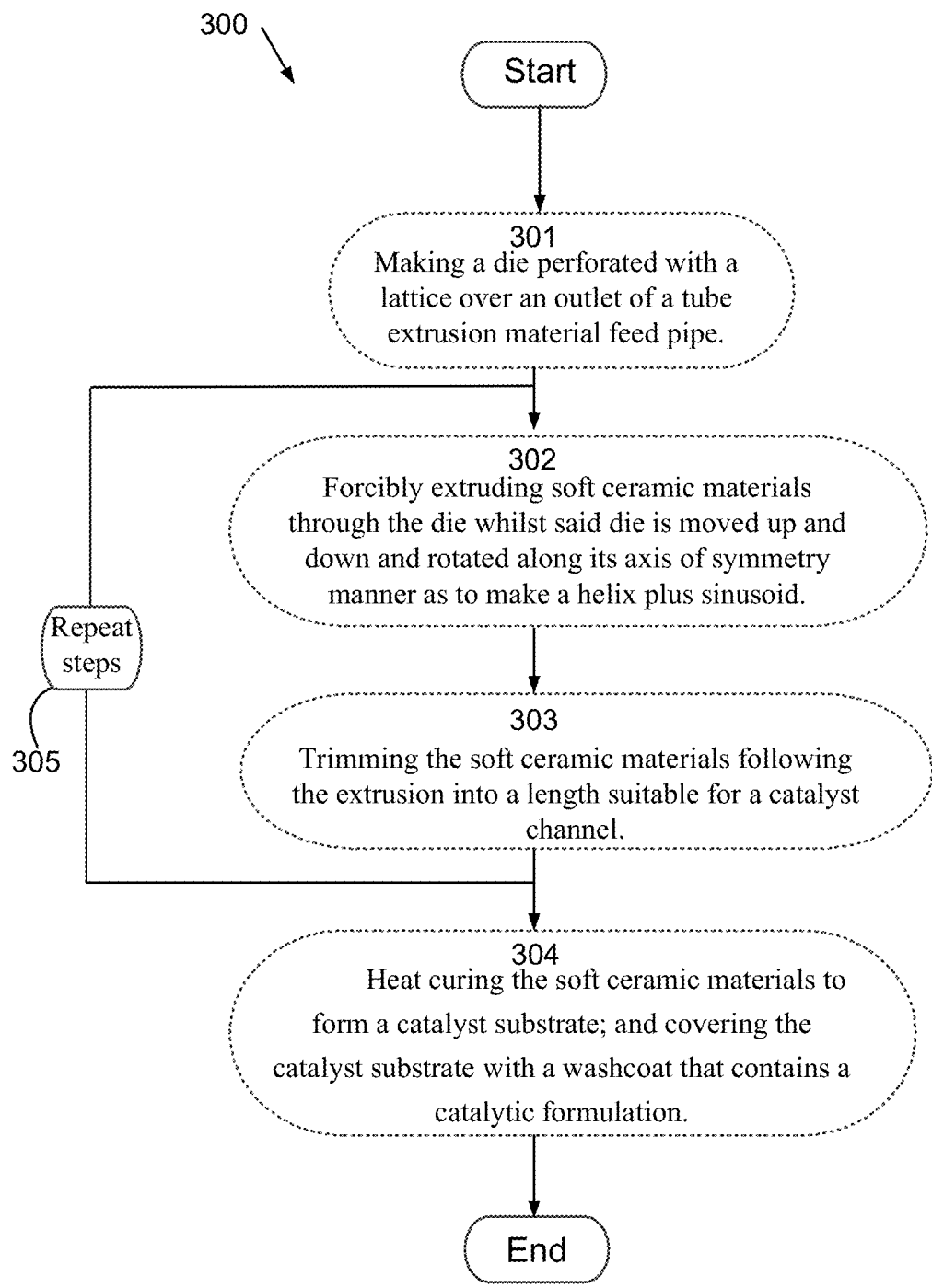
FIG. 13 is an exemplary illustration of a process for manufacturing helical plus sinusoidal channels.

In still another embodiment, there is illustrated in FIG. 13 a method 300 for manufacturing a ceramic honeycomb catalytic converter having helical plus sinusoidal flow channels, comprising the step 301 of making a die perforated with a lattice over an outlet of a tube extrusion material feed pipe; the step 302 of forcibly extruding soft ceramic materials through the die whilst the die is moved up and down and rotated along its axis of symmetry as to make a helix plus sinusoid; the step 303; trimming the soft ceramic materials following the extrusion into a length suitable for a catalyst channel; and the step 304 of heat curing the soft ceramic materials to form a catalyst substrate; and covering the catalyst substrate with washcoat that contains a catalytic formulation. In a further embodiment, the steps 302, 303 in the foregoing method are repeated 305 to mass manufacture catalytic converters with sinusoidal channels.

The terms "honeycomb", "catalytic converter", "catalytic substrate core" and "catalyst" core are used interchangeably or coextensively herein consistent with their meaning in the relevant industry.

The prior art metallic substrate core manufacturing system can be improved to manufacture metallic substrate cores with helical channels, sinusoidal and hybrid sinusoidal-helical channels. To manufacture a metallic substrate core with helical channels, a metallic substrate is manufactured into a conventional shape with straight and parallel tube-like channels, and then helically twisted into a suitable helical shape. To manufacture a metallic substrate core with sinusoidal helical channels, a metal sheet must first be formed into a sinusoidal shape. Sheets of the sinusoidal metal are stacked into a block, brazed or permanently affixed into place, and helically twisted to form sinusoidal-helical channels.

In a further embodiment, metallic honeycomb substrate cores are usually manufactured from corrugated sheets folded first into a block, and then wound into a spiral. Prior art discloses metallic honeycomb systems. E.g., see U.S. Pat. Nos. 5,063,029; 5,318,757; 5,431,330; and 5,436,216. Prior art as a whole discloses that manufacturing a honeycomb includes a metal sheet that is pressed into a desirable corrugation, which is then formed into a channel shape. During this process, sheets of corrugated metal are stacked into blocks that are spirally wound and brazed or permanently affixed into place. The blocks are then cut into individual substrate cores to form hundreds or thousands of thin, narrow, long, and identically-sized duct-like channels or cells. This series of straight and parallel tube-like channels are characteristic of a honeycomb substrate. The honeycomb is covered with a washcoat, which contains the catalytic formulation (not shown in figures).

Within the scope of this disclosure, further embodiments can be made using three-dimensional (3-D) printing technology. Recent advances in 3-D printing technology have made possible the manufacture of nearly any shape or geometry. 3-D printing technology can be applied to manufacturing both substrate cores with helical channels, sinusoidal channels, and sinusoidal plus helical channels. To manufacture helical or sinusoidal plus helical substrates cores, a computer-aided design (CAD) program would be used to generate a digital model of a substrate design, for instance as shown in FIGS. 1 and 3. The digital design can then be imported into a 3-D printer, which then manufactures a substrate core having the desired substrate shape, channel geometry (linear, helical, sinusoidal or sinusoidal-helical), length, size, cell density, wall thickness, and so on. Still other technologies, and machines for manufacturing substrate cores with helical channels, sinusoidal and sinusoidal plus helical channels are possible.

Advantageous of Non-linear Channel Geometry

Higher Catalytic Efficiency: The proposed geometry enhances the efficiency of catalytic reactions due to vorteces or similar secondary flow absent in straight channels. Efficiency of flow channels may be improved using cross-sectional shapes selected from a group including circular, square, rectangular, polygonal, wavy and triangular.

Cost Savings: In some applications, the enhanced efficiency allows a reduction of substrate volume (downsizing). Catalytic substrate conservation is of considerable economic importance since many catalyst formulations are expensive, particularly when their formulations include precious metals (platinum, palladium, and rhodium). Downsizing allows non-negligible, multi-layered savings in costs of: (a) substrate, (b) catalyst washcoat, (c) catalyst precious metal(s), (d) catalytic coating process, (e) substrate packaging materials, (f) labor as downsized substrate is easier to package and also fits on a platform such as a vehicle.

Energy Savings: Substrate downsizing means energy savings through two separate and compounding effects: (a) Smaller honeycomb substrates have reduced backpressure drop; in many applications, backpressure drop reduction yields a saving in pumping power, such as fuel savings in vehicles' engines (the so-called 'fuel economy'). Further, downsizing allows (b) weight reduction, itself another independent means of energy saving, such as fuel savings in vehicles. Further, (c) when subjected to hot flow such as in automotive exhausts, vortical structures inside the substrate channel allow substrate to heat up (light off) faster, i.e. it reduces light-off time; most engines need to inject excess fuel to assist with heating during their cold-start; faster light-off allows reducing such injected fuel during cold-start.

Pollution Control: Engine emission is typically the highest during engine cold-start; this is known as bag-1 emission in engine certification. Faster substrate light-off lowers cold-start emissions.

Use in Heat Exchangers: The combined sinusoidal-helical geometry may be utilized in heat exchangers, where enhanced heating (or cooling) of the base, career flow is of interest, usually without any increase in pumping power.

The foregoing detailed description has set forth various embodiments of devices or methods via the use of examples and drawings. In so far as such drawings and examples comprise one or more devices, steps or methods, it will be understood by those skilled in the art that each component or device or method or step within such drawing and example can be implemented, individually and/or collectively, by a wide range of any combination thereof. One skilled in the art will recognize that the herein described methods, protocols or devices or steps and objects and the discussion accompanying them are used as examples for the sake of conceptual clarity and that various methods, modifications are within the skill of those in the art. Consequently, as used herein, the specific examples or embodiments set forth and the accompanying comments and observations are intended to be representative of their more general classes. In general, use of any specific exemplar or embodiment herein is also intended to be representative of its class, and the non-inclusion of such specific steps, examples, embodiments or drawings and examples or the like herein shall not be taken as indicating that limitation is desired. The herein described subject matter sometimes illustrates different devices or methods comprised within, or associated with, different or other device(s) or methods. It is to be understood that such described device or methods, drawings and examples are merely exemplary, and that in fact many other drawings, and examples can be implemented, which achieve the same or similar results. In a conceptual sense, any device or method or protocol to achieve the same result is effectively "equivalent" to this disclosure such that the desired result is achieved. Hence, any two or more devices or methods or steps herein combined to achieve a particular result can be seen as "equivalent" to each other such that the desired result is achieved, irrespective of differences in method(s) or steps. Likewise, any two device(s) so equivalent can also be viewed as being "functionally "equivalent", to each other to achieve a desired result, and any two methods or devices capable of being so associated can also be viewed as being capable of acting together, with each other to achieve a desired result.

With respect to the use of substantially any plural and/or singular terms herein, those having skill in the art can transmute from the plural to the singular and/or from the singular to the plural as is appropriate to the context and/or application. The various singular/plural permutations are not expressly set forth herein for sake of clarity.

While particular aspects of the present subject matter described herein have been shown and described, it will be apparent to those skilled in the art that, based upon the embodiments herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" or "has" should be interpreted as "having or has at least," the term "includes" should be interpreted as "includes but is not limited to," etc.). For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions comprising only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B".

What is claimed is:

1. A honeycomb catalyst substrate core, the honeycomb catalyst substrate core comprising:
   (a) a plurality of identically-sized flow channels formed along a longitudinal axis of symmetry of the honeycomb catalyst substrate core, wherein said identically-sized flow channels have channel centerlines that are non-coincident with each other, and wherein each said identically-sized flow channel configured into a helical substrate having:
      (i) a given helical diameter;
      (ii) a given channel length; and
      (iii) a given winding number of helical turns, wherein said given winding number is independent of said given channel length, and wherein said given winding number is selected in order to optimize a pressure gradient across said helical diameter and a backpressure along said given channel length in order to produce stable Dean vortical structures;
   wherein said helical substrate is adapted to increase heat-transfer and/or mass-transfer performance through formation of said stable Dean vortical structures due to said given winding number, said pressure gradient, and said backpressure, and wherein said stable Dean vortical structures are exclusively operative under strictly non-turbulent flow conditions, which create secondary flow, lateral to a longitudinal channel base flow, and enhance interactions with channel walls.

2. The honeycomb catalyst substrate core of claim 1, wherein said helical substrate includes a ceramic material.

3. The honeycomb catalyst substrate core of claim 1, wherein said helical substrate includes a metal.

4. The honeycomb catalyst substrate core of claim 1, wherein said helical substrate includes at least one catalytic substance.

5. The honeycomb catalyst substrate core of claim 1, wherein said helical substrate includes at least one cross-sectional shape selected from the group consisting of: circular, square, rectangular, polygonal, wavy, sinusoidal, and triangular.

6. A honeycomb catalyst substrate core, the honeycomb catalyst substrate core comprising:
   (a) a plurality of identically-sized flow channels formed along a longitudinal axis of symmetry of the honeycomb catalyst substrate core, wherein said identically-sized flow channels have channel centerlines that are non-coincident with each other, and wherein each said identically-sized flow channel configured into a helical-plus-sinusoidal substrate having:
      (i) a given helical diameter;
      (ii) a given channel length; and
      (iii) a given winding number of helical turns, wherein said given winding number is independent of said given channel length, and wherein said given winding number is selected in order to optimize a pressure gradient across said helical diameter and a backpressure along said given channel length in order to produce stable Dean vortical structures;
   wherein said helical-plus-sinusoidal substrate is adapted to increase heat-transfer and/or mass-transfer performance through formation of stable vortical structures due to said given winding number, said pressure gradient and said backpressure, and wherein said stable Dean vortical structures are exclusively operative under strictly non-turbulent flow conditions, which create secondary flow, lateral to a longitudinal channel base flow, and enhance interactions with channel walls.

7. The honeycomb catalyst substrate core of claim 6, wherein said catalyst substrate includes a ceramic material.

8. The honeycomb catalyst substrate core of claim 6, wherein said catalyst substrate includes a metal.

9. The honeycomb catalyst substrate core of claim 6, wherein said helical-plus-sinusoidal substrate includes at least one catalytic substance.

10. The honeycomb catalyst substrate core of claim 6, wherein said helical-plus-sinusoidal substrate includes at least one cross-sectional shape selected from the group consisting of: circular, square, rectangular, polygonal, wavy, sinusoidal, and triangular.

11. A method for manufacturing a ceramic honeycomb catalyst substrate core having non-linear flow channels, the method comprising the steps of:
  (a) making a die perforated with a lattice over an outlet of a tube extrusion material feed pipe;
  (b) forcibly extruding soft ceramic materials through said die whilst said die is rotated along its axis of symmetry in a clockwise or counterclockwise manner in order to make a helical substrate having:
    (i) a given helical diameter;
    (ii) a given channel length; and
    (iii) a given winding number of helical turns, wherein said given winding number is independent of said given channel length, and wherein said given winding number is selected in order to optimize a pressure gradient across said helical diameter and a backpressure along said given channel length in order to produce stable Dean vortical structures;
  wherein said helical substrate is adapted to increase heat-transfer and/or mass-transfer performance through formation of stable Dean vortical structures due to said given winding number, said pressure gradient, and said backpressure, and wherein said stable Dean vortical structures are exclusively operative under strictly non-turbulent flow conditions, which create secondary flow, lateral to a longitudinal channel base flow, and enhance interactions with channel walls;
  (c) trimming a plurality of said helical substrates, wherein said helical substrates have channel centerlines that are non-coincident with each other, following said step of forcibly extruding, into a length suitable for a catalyst channel; and
  (d) heat curing said plurality of helical substrates to form the honeycomb catalyst substrate core.

12. The method of claim 11, wherein said step of forcibly extruding includes moving said die up and down along its axis of symmetry in order to superimpose a sinusoidal channel in said helical substrate.

13. The method of claim 11, wherein said step of forcibly extruding includes controlling a number of sinusoidal waveforms formed in said helical substrate per a given substrate length by adjusting a frequency, amplitude, and wavelength of an up-and-down motion with which said die is moved.

14. The method of claim 11, the method further comprising the steps of:
  (e) coating the honeycomb catalyst substrate core with a washcoat that contains a catalytic formulation;
  (f) covering the honeycomb catalyst substrate core with a mat cover that forms a skin over said plurality of said helical substrates; and
  (g) installing the honeycomb catalyst substrate core in a protective outer metal housing having an inlet and an outlet on opposite ends through which exhaust gases enter and exit said protective outer metal housing.

15. The method of claim 11, wherein said step of forcibly extruding includes controlling said given winding number of helical turns formed in said helical substrate per a given substrate length by adjusting a frequency with which said die is rotated clockwise or counterclockwise.

16. The method of claim 11, wherein said step of forcibly extruding includes controlling a superimposed shape of helical-plus-sinusoidal channels formed in said helical substrate per a given substrate length by adjusting a frequency with which said die is rotated clockwise or anticlockwise combined with an up-and-down motion of said die.

17. A method for manufacturing a metallic honeycomb catalyst substrate core having non-linear flow channels, the method comprising the steps of:
  (a) pressing a metal sheet into a corrugated pattern having a plurality of identically-sized flow channels formed along a longitudinal axis of said pressed metal sheet;
  (b) stacking a plurality of said pressed metal sheets all oriented along their longitudinal axes;
  (c) permanently affixing each of said pressed metal sheets to each other into a block; and
  (d) trimming said block into a length suitable for a catalyst substrate.

18. The method of claim 17, wherein said step of pressing said metal sheet forms identically-sized helical grooves in a flow direction along said longitudinal axis of said pressed metal sheet in lieu of said corrugated pattern, wherein said identically-sized helical grooves have groove axes that are non-coincident with each other, and wherein each said identically-sized helical groove having:
  (i) a given helical diameter;
  (ii) a given channel length; and
  (iii) a given winding number of helical turns, wherein said given winding number is independent of said given channel length, and wherein said given winding number is selected in order to optimize a pressure gradient across said helical diameter and a backpressure along said given channel length in order to produce stable Dean vortical structures:
  wherein said each identically-sized helical groove is adapted to increase heat-transfer and/or mass-transfer performance through formation of stable Dean vortical structures due to said given winding number, said pressure gradient, and said backpressure, and wherein said stable Dean vortical structures are exclusively operative under strictly non-turbulent flow conditions, which create secondary flow, lateral to a longitudinal channel base flow, and enhance interactions with channel walls.

19. The method of claim 17, the method further comprising the step of:
  (f) prior to said step of trimming, helically twisting said block along a longitudinal axis of said block to form helical grooves along said axis, wherein said helical grooves have groove axes that are non-coincident with each other, and wherein each said helical groove has:
    (i) a given helical diameter;
    (ii) a given channel length; and
    (iii) a given winding number of helical turns, wherein said given winding number is independent of said given channel length, and wherein said given winding number is selected in order to optimize a pressure gradient across said helical diameter and a backpressure along said given channel length in order to produce stable Dean vortical structures;

wherein said step of pressing said metal sheet forms sinusoidal grooves along said longitudinal axis of said pressed metal sheet in a flow direction in lieu of said corrugated pattern, wherein said sinusoidal grooves are adapted to increase heat-transfer and/or mass-transfer performance through formation of stable vortical structures due to said given winding number, said pressure gradient, and said backpressure, and wherein said stable Dean vortical structures are exclusively operative under strictly non-turbulent flow conditions, which create secondary flow, lateral to a longitudinal channel base flow, and enhance interactions with channel walls.

20. A method for manufacturing a honeycomb catalyst substrate core having non-linear flow channels, the method comprising the step of using three-dimensional printing to fabricate the honeycomb catalyst substrate core having a plurality of identically-sized flow channels formed along a longitudinal axis of symmetry of the honeycomb catalyst substrate core, wherein said identically-sized flow channels have channel centerlines that are non-coincident with each other, and wherein each said identically-sized flow channel configured into a helical substrate having:
(a) a given helical diameter;
(b) a given channel length; and
(c) a given winding number of helical turns, wherein said given winding number is independent of said given channel length, and wherein said given winding number is selected in order to optimize a pressure gradient across said helical diameter and a backpressure along said given channel length in order to produce stable Dean vortical structures;

wherein said helical substrate is adapted to increase heat-transfer and/or mass-transfer performance through formation of stable Dean vortical structures due to said given winding number, said pressure gradient and said backpressure, and wherein said stable Dean vortical structures are exclusively operative under strictly non-turbulent flow conditions, which create secondary flow, lateral to a longitudinal channel base flow, and enhance interactions with channel walls.

21. The method of claim 18, the method further comprising the step of:
(e) prior to said step of trimming, sinusoidally contorting said block along a longitudinal axis of said block to form waveforms along said axis.

22. A honeycomb catalyst substrate core, the honeycomb catalyst substrate core comprising:
(a) a plurality of identically-sized flow channels formed along a longitudinal axis of symmetry of the honeycomb catalyst substrate core, wherein said identically-sized flow channels have channel centerlines that are non-coincident with each other, and wherein each said identically-sized flow channel configured into a sinusoidal-plus-helical substrate having:
(i) a given helical diameter;
(ii) a given channel length; and
(iii) a given winding number of helical turns, wherein said given winding number is independent of said given channel length, and wherein said given winding number is selected in order to optimize a pressure gradient across said helical diameter and a backpressure along said given channel length in order to produce stable Dean vortical structures;

wherein said sinusoidal-plus-helical substrate is adapted to increase heat-transfer and/or mass-transfer performance through formation of stable vortical structures due to said given winding number, said pressure gradient, and said backpressure, and wherein said stable Dean vortical structures are exclusively operative under strictly non-turbulent flow conditions, which create secondary flow, lateral to a longitudinal channel base flow, and enhance interactions with channel walls.

23. The honeycomb catalyst substrate core of claim 22, wherein said sinusoidal-plus-helical substrate includes at least one material selected from the group consisting of: a ceramic material and a metal.

24. The honeycomb catalyst substrate core of claim 22, wherein said sinusoidal-plus-helical substrate includes at least one catalytic substance.

25. The honeycomb catalyst substrate core of claim 22, wherein said sinusoidal-plus-helical substrate includes at least one cross-sectional shape selected from the group consisting of: circular, square, rectangular, polygonal, wavy, sinusoidal, and triangular.

26. The honeycomb catalyst substrate core of claim 1, the honeycomb catalyst substrate core further comprising:
(b) a washcoat within which a catalyst is embedded, said washcoat being applied over said catalyst substrate;
(c) a mat cover that forms a skin over said plurality of identically-sized flow channels; and
(d) a housing that forms a protective outer shell over said plurality of identically-sized flow channels, said housing having an inlet and an outlet on opposite ends of said plurality of identically-sized flow channels, said inlet and said outlet being configured for exhaust gases to pass through said plurality of identically-sized flow channels.

* * * * *